United States Patent
Liu et al.

(10) Patent No.: US 9,826,156 B1
(45) Date of Patent: Nov. 21, 2017

(54) DETERMINING CAMERA AUTO-FOCUS SETTINGS

(71) Applicant: AMAZON TECHNOLOGIES, INC., Reno, NV (US)

(72) Inventors: Yue Liu, Seatttle, WA (US); Avnish Sikka, Seatttle, WA (US)

(73) Assignee: AMAZON TECHNOLOGIES, INC., Reno, NV (US)

( * ) Notice: Subject to any disclaimer, the term of this patent is extended or adjusted under 35 U.S.C. 154(b) by 172 days.

(21) Appl. No.: 14/741,248

(22) Filed: Jun. 16, 2015

(51) Int. Cl.
| | |
|---|---|
| *H04N 5/222* | (2006.01) |
| *H04N 5/225* | (2006.01) |
| *G03B 35/00* | (2006.01) |
| *G01B 11/14* | (2006.01) |
| *H04N 5/232* | (2006.01) |
| *G03B 13/36* | (2006.01) |

(52) U.S. Cl.
CPC ......... *H04N 5/23251* (2013.01); *G01B 11/14* (2013.01); *G03B 13/36* (2013.01); *H04N 5/2258* (2013.01)

(58) Field of Classification Search
None
See application file for complete search history.

(56) References Cited

U.S. PATENT DOCUMENTS

| | | | | |
|---|---|---|---|---|
| 5,880,815 A | * | 3/1999 | Yamamura | G03B 37/04 352/70 |
| 7,860,387 B2 | | 12/2010 | Ishikawa | |
| 9,071,738 B2 | * | 6/2015 | Pace | H04N 5/225 |
| 9,253,391 B2 | | 2/2016 | Kimoto | |
| 2009/0030295 A1 | * | 1/2009 | Shioi | A61B 1/227 600/316 |
| 2011/0164108 A1 | | 7/2011 | Bates et al. | |
| 2012/0069019 A1 | * | 3/2012 | Richards | G06T 7/536 345/421 |
| 2013/0033485 A1 | * | 2/2013 | Kollin | G06F 1/1637 345/419 |
| 2013/0141523 A1 | | 6/2013 | Banta et al. | |
| 2013/0141526 A1 | | 6/2013 | Banta et al. | |
| 2013/0235213 A1 | * | 9/2013 | Kennedy | G06T 7/85 348/187 |

(Continued)

OTHER PUBLICATIONS

CENTR Camera [online]. Retrieved from: centrcam.com/#camera. [Retrieved on Apr. 7, 2015].

(Continued)

*Primary Examiner* — Reza Aghevli
(74) *Attorney, Agent, or Firm* — Polsinelli LLP

(57) ABSTRACT

A system and method of determining a tilt angle of a portable computing device using sensor data; identifying a tilt angle from a plurality of predetermined tilt angle ranges; determining focal length settings for image capture devices of the portable computing device using the tilt angle, adjustment increments, and autofocus scan range algorithms. A portable computing device including a processor; a first image capture device on a first side of the portable computing device, and a second image capture device on the second side of the portable computing device, the second side located opposite of the first side; and a memory device including instructions operable to be executed by the processor to perform a set of actions, enabling the portable computing device to perform the method.

18 Claims, 20 Drawing Sheets

(56) References Cited

U.S. PATENT DOCUMENTS

| | | | | |
|---|---|---|---|---|
| 2015/0241713 A1* | 8/2015 | Laroia | ............... | G02B 27/648 |
| | | | | 348/208.2 |
| 2015/0244927 A1* | 8/2015 | Laroia | ............... | H04N 5/23212 |
| | | | | 348/240.99 |
| 2016/0025488 A1 | 1/2016 | Wood et al. | | |
| 2016/0073104 A1* | 3/2016 | Hillebrand | ........... | H04N 17/002 |
| | | | | 348/47 |
| 2016/0104285 A1* | 4/2016 | Pettegrew | ................. | G06T 7/80 |
| | | | | 348/36 |
| 2016/0105649 A1* | 4/2016 | Pettegrew | ................. | G06T 7/80 |
| | | | | 348/37 |
| 2016/0189361 A1* | 6/2016 | Lo | ..................... | H04N 13/0271 |
| | | | | 382/106 |
| 2016/0353083 A1* | 12/2016 | Aoki | ....................... | G06T 7/521 |
| 2017/0084032 A1 | 3/2017 | Zeng et al. | | |

OTHER PUBLICATIONS

Developing Firefly Plugins Amazon Apps & Services Developer Portal [online]. Retrieved from: https://developer.amazon.com/public/solutions/devices/firephone/docs/developingfireflyplugins. [Retrieved on Apr. 7, 2015].

Firefly Plugin Examples Amazon Apps & Services Developer Portal [online]. Retrieved from: https://developer.amazon.com/public/solutions/devices/firephone/docs/fireflypluginexamples. [Retrieved on Apr. 7, 2015].

Understanding Firefly Amazon Apps & Services Developer Portal [online]. Retrieved from: https://developer.amazon.com/public/solutions/devices/firephone/docs/understandingfirefly. [Retrieved on Apr. 7, 2015].

\* cited by examiner

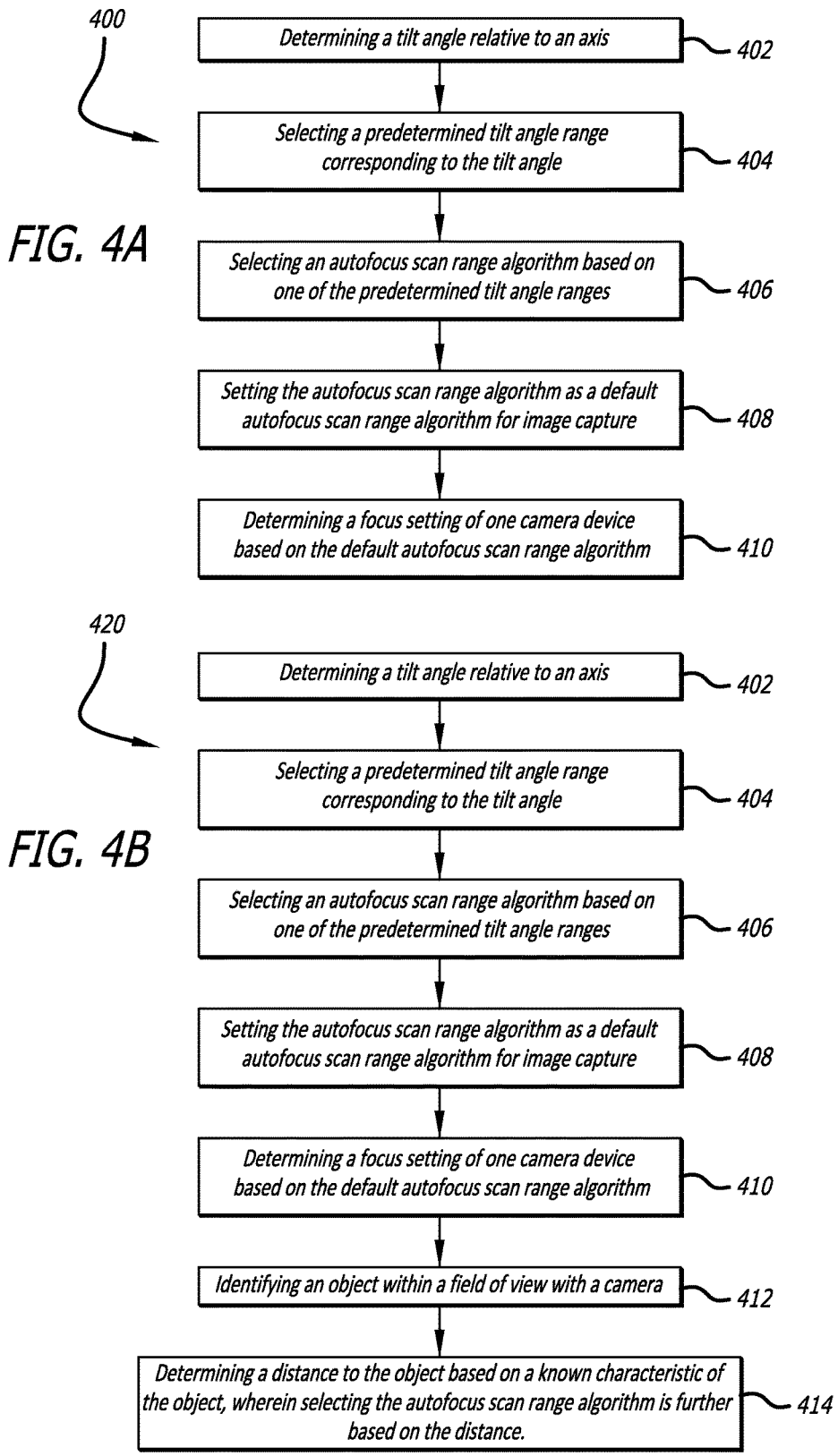

DETERMINING CAMERA AUTO-FOCUS SETTINGS

BACKGROUND

People are increasingly utilizing portable computing devices to take pictures. High quality, high resolution images may be captured with a portable computing device equipped with a lens system, such as a movable lens system. The lens system may be controlled by an automatic lens focusing system, also referred to as an autofocus system. An autofocus system may determine one or more focus settings that may include an appropriate lens position or configuration that will result in a sharp and clearly focused image of an object or a situation. It is desirable to obtain the appropriate focus settings quickly in portable computing devices to conserve battery power, processing capacity, and to provide a good user experience that allows the user to quickly capture a well-focused image. While autofocus techniques exist, many are slow, wasting power, processing capability, and time. Other autofocus techniques may not adequately focus the lens quickly enough or accurately enough to provide a high quality, high resolution image.

Further, in order to obtain desirable images, portable computing devices may utilize an autofocus scan range algorithm to adjust the lens of the camera(s) capturing the image(s). In conventional approaches, the autofocus scan range algorithm may operate through several iterations to obtain a satisfactory setting for the present image conditions. Each iteration may use precious time, power, and processing capability of a computing device. The latency of each iteration may delay a user's ability to capture an image of an object or a situation subject to change or movement over time. The operation of multiple iterations consumes battery power and processing capability which may impact the overall performance of the portable computing device. Such factors may result in a poor user experience. A need, therefore, exists for optimized autofocus systems.

BRIEF DESCRIPTION OF THE DRAWINGS

Various embodiments in accordance with the present disclosure will be described with reference to the drawings, in which:

FIGS. 4A-4B are flow chart diagrams, illustrating exemplary processes for determining an autofocus scan range algorithm of a camera that may be used in accordance with various embodiments;

DETAILED DESCRIPTION

Figure 1A:
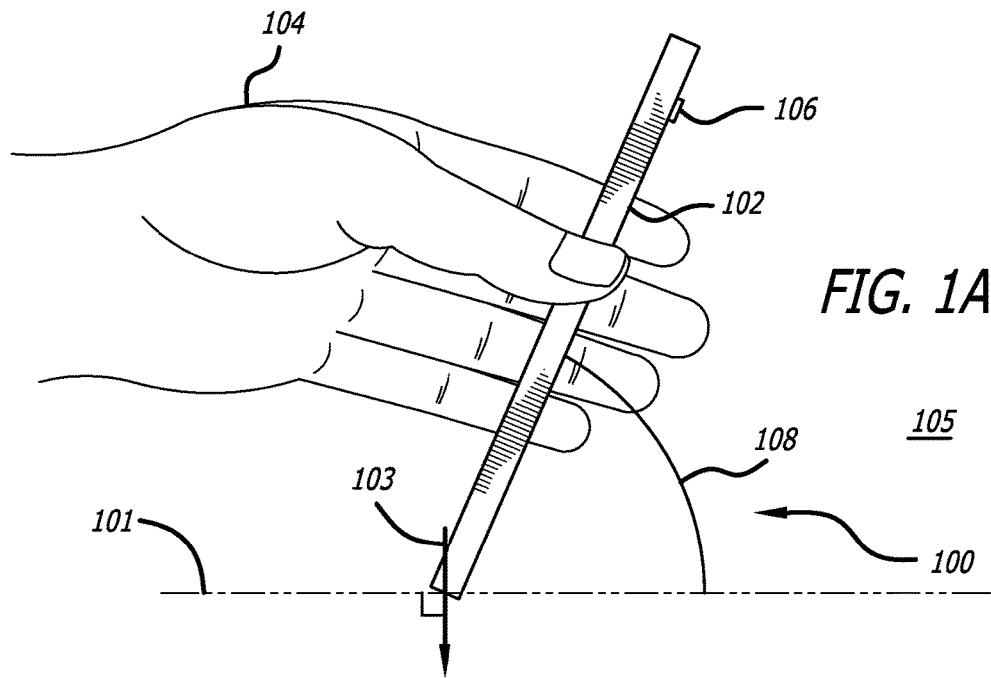
FIGS. 1A-1G are schematic diagrams, illustrating examples of a user capturing an image using a portable computing device.

Systems and methods in accordance with various embodiments of the present disclosure may overcome one or more of the aforementioned and other deficiencies experienced in conventional approaches to capturing images in an electronic environment. In particular, various approaches provide for the determining and updating of one or more settings of a camera of a portable computing device using sensor information (e.g., tilt angle, distance, light, etc.) from one or more other sensors of the portable computing device.

In certain embodiments, approaches in accordance with various embodiments attempt to determine a tilt angle or an orientation of a portable computing device. More specifically, such embodiments may determine the title angle or an orientation of a surface of a lens of a camera of a portable computing device. Typically, but not necessarily, the surface of the lens of a camera of a portable computing device is parallel with, or even flush with, a surface of the portable computing device. In which case, the tilt angle or orientation of the portable computing device is approximately equivalent to the title angle or orientation of the surface of a lens of the camera. Such embodiments may use the tilt angle or the orientation of the portable computing device to select an autofocus scan range algorithm, adjust the camera lens position based on the autofocus scan range algorithm, and capture an image of the object with the camera of the portable computing device.

For example, in at least some embodiments, a portable computing device with at least one camera may be directed at an object. The portable computing device may be oriented in a particular way, i.e., at a tilt angle, relative to the object, relative to an arbitrarily defined axis, or relative to gravity. An intuitive and useful axis relative to which a tilt angle may be specified may be an axis that is perpendicular to the direction of gravity. Such an axis is generally parallel to a flat, level surface, making the axis a convenient and intuitive reference point from which to measure the tilt angle of a portable computing device, particularly a handheld portable computing device. As used herein, the term "the horizontal" or "the horizontal axis" refers to an axis that is perpendicular to the direction of gravity. The portable computing device may determine the tilt angle relative to gravity or relative to the horizontal using at least one sensor of the portable computing device. Based at least in part on the determined tilt angle, an autofocus scan range algorithm may be selected from a memory of the portable computing device. The lens of the camera may then be adjusted according to the selected autofocus scan range algorithm. For example and without limitation, a first autofocus scan range algorithm may be used for tilt angles greater than 75 degrees from the horizontal. A second autofocus scan range algorithm may be used for tilt angles less than 25 degrees from the horizontal. A third auto focus scan range algorithm may be used for tilt angles in the range including 25 through 75 degrees from the horizontal. The image of the object is captured by the camera using the selected focus setting. The portable computing device may store the captured image and compare the captured image to other stored images utilizing the same or similar autofocus scan range algorithms. When a subsequent image is captured using the same or similar autofocus scan range algorithm, the portable computing device may compare it to previous captured images. If a match is found, the portable computing device may apply the previous autofocus setting to the camera to quickly capture a high quality, high resolution image without additional determination or processing, conserving resources and improving image capture time. A given autofocus range algorithm may also be adjusted, modified, or optimized based on a determined tilt angle by changing one or more aspects of the autofocus range algorithm. For example, an initial focal length and an adjustment increment may be specified based on a tilt angle.

In other embodiments, various approaches provide for the determination of distance of an object to the camera of the portable computing device using an image of an object captured by the camera of the portable computing device. For example, in at least some embodiments, using the image of an object captured by the camera and comparing it to a library of recognized, predetermined objects with known dimensions, the portable computing device may determine an approximate distance of the camera of the portable computing device from the object. For example, the library of recognized, predetermined objects may include information such as the size of a human finger at certain distances from the camera, such as 1 cm, 5 cm, or 10 cm captured using the same or similar autofocus scan range algorithm. Upon recognizing a captured image as an image of a human finger, a comparison may be made of various aspects of the captured image with one or more items in the library of recognized, predetermined objects. For example, the size of the finger in the captured image may be compared to the library of recognized, predetermined objects. Based at least in part on such a comparison, the portable computing device may approximately determine a distance of the human finger from the camera of the portable computing device using the same or similar autofocus scan range algorithm.

In other embodiments, various approaches provide for the determination of a distance of an object to the portable computing device using multiple images of an object captured by the camera of the portable computing device. For example, in at least some embodiments, using multiple images of an object captured by the camera and comparing them to a library of recognized, predetermined objects with known dimensions, the portable computing device may approximately determine a distance of the camera of the portable computing device from the object. The portable computing device may capture a series of images of the object, over a predetermined period of time, to determine a motion of the object relative to the camera or relative to the portable computing device. Autofocus scan range algorithms may be selected or adjusted based on the determined relative motion of the object. For example, if the images are that of a human finger, the camera of the portable computing device may capture a series of images, over a predetermined period of time, and compare the captured images to the image(s) of a human finger in the known library to approximately determine the distance of the human finger to the camera of the portable computing device. For example, if the captured images show the size of the human finger to be decreasing, the portable computing device may determine that the human finger is moving away from the camera of the portable computing device, and may select a different autofocus scan range algorithm depending upon the current location of the human finger, i.e., the most recent finger capture image. Alternatively, if the captured images show the size of the human finger is relatively constant, the portable computing device may determine that the human finger is relatively stationary, and may maintain the current autofocus scan range algorithm based on the most recent finger capture image. If the captured images show that the size of the human finger is increasing, the portable computing device may determine that the human finger is coming closer to the camera or to the portable computing device, and may select a different autofocus scan range algorithm depending upon the current location of the human finger, i.e., the most recent finger capture image.

Some embodiments relate to systems that may include a processor; a camera; a sensor that generates sensor data indicating a gravitational pull on the portable computing device; and a memory device. The memory device may include instructions operable to be executed by the processor to perform a set of actions, enabling the system to: determine a tilt angle of the camera using the sensor data; identify a tilt angle range from a plurality of predetermined tilt angle ranges, wherein the tilt angle range overlaps with the tilt angle of the camera; determine a first focal length setting using a first associative array that associates the tilt angle range with the first focal length setting; determine an adjustment increment using a second associative array that associates the adjustment increment with the tilt angle range; and determine a second focal length setting of the camera using the adjustment increment according to an autofocus scan range algorithm. As used herein, an associative array, map, symbol table, or dictionary is an abstract data type composed of a collection of (key, value) pairs, such that each possible key appears just once in the collection.

According to some other embodiments, the set of actions may further enable the system to: capture image data of an object within a field of view of the camera; determine an identity of the object by comparing the image data with image data of known objects; determine a dimension of the object by comparing the identity of the object with dimensional data of known objects; determine a distance from the camera to the object by comparing the dimension of the object with a scale of the object in the captured image data relative to known dimensions of the field of view of the camera; use the distance to determine the first focal length setting, wherein the first focal length setting focuses the camera at the distance; and use the distance to determine the adjustment increment using a third associative array that associates the adjustment increment with the distance. The set of actions may further enable the system to: identify a touch gesture on a touch screen, the touch gesture being a pinch-to-zoom gesture or a tap-to-zoom gesture; and use the touch gesture to determine the first focal length setting and the adjustment increment instead of the tilt angle of the camera. The touch-gesture may, for example, be interpreted as overriding the determination of the focal length(s) or adjustment increment(s) based on the tilt angle or tilt angle data.

Some embodiments relate to systems that may include a processor; a first image capture device on a first side of the portable computing device; a second image capture device on a second side of the portable computing device, wherein the second side opposes the first side; and a memory device. The memory device may include instructions operable to be executed by the processor to perform a set of actions, enabling the system to: determine a tilt angle of the portable computing device using sensor data; identify a tilt angle range from a plurality of predetermined tilt angle ranges, wherein the tilt angle range overlaps with the tilt angle of the portable computing device; determine a first focal length setting for the first image capture device using a first associative array that associates the tilt angle range with the first focal length setting; determine a first adjustment increment for the first image capture device using a second associative array that associates the tilt angle range with the first adjustment increment; determine a second focal length setting for the first image capture device using the first adjustment increment according to a first autofocus scan range algorithm; determine a third focal length setting for the second image capture device using a third associative array that associates the tilt angle range with the third focal length setting; determine a second adjustment increment for the second image capture device using a fourth associative array that associates the tilt angle range with the second adjustment increment; and determine a fourth focal length setting for the second image capture device using the second adjustment increment according to a second autofocus scan range algorithm. According to some embodiments, the system may further include a sensor that generates the sensor data. The sensor data may indicate a gravitational pull on the portable computing device. The set of actions may further include enabling the system to: capture image data of an object within a field of view of a first image capture device; determine an identity of the object by comparing the image data with image data of known objects; determine a dimension of the object by comparing the identity of the object with dimensional data of known objects; determine a distance from the first image capture device to the object by comparing the dimension of the object with a scale of the object in the captured image data relative to known dimensions of the field of view of the image capture device; determine the first focal length setting to focus the first image capture device at the distance; and determine the first adjustment increment using a fifth associative array that associates the distance with the first adjustment increment.

Some embodiments relate to a portable computing device that may include a processor; a first image capture device or element; and a memory device. The memory device may include instructions operable to be executed by the processor to perform a set of actions, enabling the portable computing device to: obtain tilt angle data representing a tilt angle of the first image capture device relative to an axis; and determine a first focal length setting for the first image capture device based at least in part on the tilt angle data. The image capture device or image capture element may be any type of camera, any type of sensor, and combinations thereof. As discussed herein in greater detail, the image capture device or element may include, or be based at least in part upon any appropriate technology, such as a CCD or CMOS image capture element having a determined resolution, focal range, viewable area, and capture rate.

The instructions may be operable to further enable the portable computing device to: determine an adjustment increment for an autofocus scan range algorithm based at least in part on the tilt angle data; and determine a second focal length setting for the first image capture device by using the adjustment increment according to the autofocus scan range algorithm. The instructions may be operable to further enable the portable computing device to: determine the first focal length setting based at least in part on altitude data representing an altitude of the portable computing device.

The instructions may be operable to further enable the portable computing device to: assign a first weight factor to the tilt angle; and assign a second weight factor the altitude data, and determine the first focal length setting based at least in part on the first weight factor and the second weight factor. The instructions may also be operable to further enable the portable computing device to: determine that the altitude of the portable computing device exceeds a predetermined altitude; and assign the second weight factor to be greater than the first weight factor.

According to some embodiments, the instructions may be operable to further enable the portable computing device to: identify an object within a field of view of the first image capture device; determine a distance from the portable computing device to the object based at least in part on a known characteristic of the object; and determine the first focal length setting based at least in part on the distance. The instructions may also be operable to further enable the portable computing device to: determine an orientation of the portable computing device; and construct a three-dimensional navigation model based at least on the identity of the object within the field of view of the first image capture device and the distance from the portable computing device to the object.

The instructions may be operable to further enable the portable computing device to determine the first tilt angle data using at least one of a gyroscope and an accelerometer. The instructions may be operable to and the portable computing device may be configured to identify a touch gesture on a touch screen of the portable computing device; and wherein the instructions are operable to further enable the portable computing device to determine the first focal length setting based at least in part on the touch gesture.

Some embodiments relate to a portable computing device that may include a processor; a first image capture device; a second image capture device; a memory device. The memory device may include instructions operable to be executed by the processor to perform a set of actions, enabling the portable computing device to:

obtain tilt angle data representing a tilt angle of the portable computing device relative to an axis; determine a first focal length setting for the first image capture device based at least in part on the tilt angle data; and determine a second focal length setting for the second image capture device based at least in part on the tilt angle data. The set of actions may further enable the portable computing device to: determine a first adjustment increment for the first image capture device based at least in part on the tilt angle data; determine a third focal length setting for the first image capture device by using the first adjustment increment according to a first autofocus scan range algorithm; determine a second adjustment increment for the second image capture device based at least in part on the tilt angle data; and determine a fourth focal length setting for the second image capture device by using the second adjustment increment according to a second autofocus scan range algorithm.

According to some embodiments, the portable computing device may further include at least one of a gyroscope and an accelerometer, and wherein the set of actions further enable the portable computing device to: determine the tilt angle data using at least one of the gyroscope and the accelerometer to determine the tilt angle of the portable computing device relative to a direction of gravity. The portable computing device may further include a touch screen, and wherein the set of actions further enable the portable computing device to: identify a touch gesture on the touch screen; and determine at least one of the first focal length setting for the first image capture device and the second focal length setting for the image capture device based at least in part on the touch gesture.

According to some embodiments, the set of actions may further enable the portable computing device to: identify a first object within a field of view of the first image capture device; determine a distance from the portable computing device to the first object based at least in part on a known characteristic of the first object; and use the distance to determine the first focal length setting, wherein the first focal length setting focuses the first image capture device at the distance.

According to some embodiments, the set of actions may further enable the portable computing device to: determine the first focal length setting based at least in part on altitude data representing an altitude of the portable computing device. The set of actions may further enable the portable computing device to: assign a first weight factor to the tilt angle data; and assign a second weight factor to the altitude data, and determine the autofocus scan range algorithm based at least in part on the first weight factor and the second weight factor. The set of actions may further enable the portable computing device to: determine that the altitude of the portable computing device exceeds a predetermined altitude; and assign the second weight factor to be greater than the first weight factor.

The set of actions may further enable the portable computing device to: identify a touch gesture on a touch screen of the portable computing device; and determine the first focal length setting based at least in part on the touch gesture. The touch gesture may be any type of touch gesture, including but not limited to a pinch-to-zoom gesture, a tap-to-zoom gesture or a combination thereof.

Some embodiments relate to a method that includes receiving tilt angle data representing a tilt angle of a first image capture device relative to an axis; and determining a first focal length setting for the first image capture device based at least in part on the tilt angle data. The method may further include determining an adjustment increment for an autofocus scan range algorithm based at least in part on the tilt angle data; and determining a second focal length setting for the first image capture device by using the adjustment increment according to the autofocus scan range algorithm. Determining the first focal length setting may, according to some non-limiting embodiments, further based at least in part on altitude data representing an altitude of the first image capture device.

Various embodiments of the method can further involve assigning a first weight factor to the tilt angle data; and assigning a second weight factor to the altitude data. According to such embodiments, determining the autofocus scan range algorithm may further based at least in part on the first weight factor and the second weight factor. Other embodiments may involve determining that the altitude of the first image capture device exceeds a predetermined altitude; and assigning the second weight factor to be greater than the first weight factor. The method may further include determining the tilt angle of the portable computing device using at least one of a gyroscope and accelerometer. The method may further include identifying a touch gesture on a touch screen of the portable computing device, wherein determining first focal length setting is further based at least in part on the touch gesture. Some embodiments of the method may further include identifying an object within a field of view of the camera; determining a distance from the portable computing device to the object based at least in part on a known characteristic of the object; and determining the first focal length setting based at least in part on the distance.

Various embodiments relate to a method that may include obtaining tilt angle data representing a tilt angle of a portable computing device relative to an axis, the portable computing device comprising a first image capture device and a second image capture device; determining a first focal length setting for the first image capture device based at least in part on the tilt angle data; and determining a second focal length setting for the second image capture device based at least in part on the tilt angle data.

The method may further include determining a first adjustment increment for the first image capture device based at least in part on the tilt angle data; determining a third focal length setting for the first image capture device by using the first adjustment increment according to a first autofocus scan range algorithm; determining a second adjustment increment for the second image capture device based at least in part on the tilt angle data; and determining a fourth focal length setting for the second image capture device by using the second adjustment increment according to a second autofocus scan range algorithm.

Various embodiments of the method may include determining the tilt angle data using at least one of a gyroscope and an accelerometer to determine the tilt angle of the portable computing device relative to a direction of gravity. The method may include determining the first focal length setting is further based at least in part on altitude data representing an altitude of the portable computing device. The method may further include assigning a first weight factor to the tilt angle data; and assigning a second weight factor to the altitude data, and wherein determining the autofocus scan range algorithm is further based at least in part on the first weight factor and the second weight factor. The method may include determining that the altitude of the portable computing device exceeds a predetermined altitude; and assigning the second weight factor to be greater than the first weight factor. The method may further include identifying a touch gesture on a touch screen of the portable computing device, wherein determining the first focal length setting is further based at least in part on the touch gesture.

An algorithm is a formula, a step-by-step set of operations to be performed. An algorithm is a method that can be expressed in a finite amount of space and time for calculating a function. Beginning with an initial state and initial input, the algorithm describes a computation, that when executed, proceeds through a finite number of steps, producing an output and ending at a final state. Essentially, an algorithm solves a problem.

For example, one algorithm can be used to find the largest number in a list of random numbers. Finding the solution requires examining every number in the list. From this follows a simple algorithm, which can be stated as: (1) If there are no numbers in the list then there is no highest number; (2) Assume the first number in the list is the largest number; (3) For each remaining number in the list, if this number is larger than the current largest number, consider this number to be the new largest number in the list; (4) When there are no numbers left in the list, consider the current largest number to the largest number in the list. This type of algorithm can be referred to as a brute force algorithm, in that each number in the list is examined individually and separately, since the overall list of numbers is not known or examined in advance.

In another example, known as a bubble sort algorithm, the algorithm repeatedly steps through a list of numbers to be sorted, compares each pair of adjacent items and swaps them if they are in the wrong order (for example, numerical or alphabetical order). The pass through the list is repeated until no swaps are needed, which indicates that the list is sorted. Like the first example, this type of algorithm is also a brute force algorithm.

A famous example of an algorithm is Euclid's Algorithm. This algorithm determines the greatest common divisor between two numbers. Assume two numbers, such as 16 and 12. Divide the first by the second. If there is a remainder (in this example, 4), divide the first number, 16, by that remainder, 4, which gives you 4 and no remainder. The process is complete. The number 4 is the greatest common divisor. This is an example of a computational algorithm, requiring computations at each step. This algorithm differs from the previous two algorithms, which do not require computation, only comparison of two elements.

A final example of an algorithm is a binary search algorithm. This algorithm finds the position of a target value in a sorted array. The first step is to compare the target value to the value of the middle element in the sorted array. If the target value is equal to the middle element's value, the position is returned. If the target value is smaller, the search continues on the lower half of the array. If the target value is larger, the search continues on the upper half of the array. The process continues until the element is found and its positioned is returned, or there are no more elements left to search for in the array and a "not found" indicator is returned. This algorithm can be considered a divide-and-conquer search algorithm, as opposed to a brute force search algorithm as the first two examples Various other applications, processes, and uses are presented below with respect to the various embodiments.

FIG. 1A is a schematic diagram, illustrating an exemplary situation 110 wherein a user 104 is holding a portable computing device 102 at a tilt angle 108 relative to a horizontal axis 101 that is perpendicular to an axis 103 that is parallel to a direction of gravity. Although a portable computing device 102 (e.g., an electronic book reader, smart phone, or tablet computer) is shown, it should be understood that any electronic device capable of receiving, determining, and/or processing input may be used in accordance with various embodiments discussed herein, where the devices may include, for example, desktop computers, notebook computers, personal data assistants, video gaming consoles, television set top boxes, smart televisions, portable media players, and autonomous vehicles, among others.

FIGS. 1A-1G are schematic diagrams, illustrating exemplary situations of a user capturing an image using a portable computing device. In each situation an autofocus scan range algorithm may be selected from a plurality of autofocus scan range algorithms based at least on a tilt angle of camera or of the portable computing device. The tilt angle may be measured between a face of a lens of the camera to a direction of gravity or to a horizontal axis that is perpendicular to a direction of gravity. The plurality of autofocus scan range algorithms may be stored in a memory that is accessible to the portable computing device. Each of the plurality of autofocus scan range algorithms may be associated with a range of tilt angles for which the autofocus scan range algorithm is likely to be applicable. For example, when a camera or a portable computing device is tilted at an obtuse angle relative to a horizontal axis that is perpendicular to a direction of gravity, a long-distance autofocus scan range algorithm may be preferable, because the user may be more likely to be pointing the camera at a distant object. Similarly, when a camera or a portable computing device is tilted at an acute angle relative to a horizontal axis that is perpendicular to a direction of gravity, a near-focus autofocus scan range algorithm may be preferable, because the user may be more likely to be pointing the camera at a nearby object. In any case, the selected autofocus scan range algorithm may be set as the default autofocus scan range algorithm for a current image capture or for a future image capture. A focus setting of at least one camera may then be determined based at least in part on the default autofocus scan range algorithm. Additionally or alternatively, one or more aspects of a given autofocus scan range algorithm may be adjusted based on the tilt angle. The one or more aspects may, for example, include an initial focal length, or an increment for adjusting the focal length according to a given autofocus scan range algorithm. An initial focal length parameter of an autofocus scan range algorithm may be scaled based on or in proportion to a tilt angle. Similarly, an increment for adjusting the focal length for an autofocus scan range algorithm may be scaled based on or in proportion to a tilt angle.

As shown in FIG. 1A, the user 104 is pointing the camera 106 at an object 105. In this example, the user 104 may be pointing the portable computing device 102 at an object 105 that is in relatively close proximity to the camera 106. The portable computing device 102 determines the tilt angle 108 relative to the axis 101 through at least one sensor, such as but not limited to an accelerometer, a gyroscope, an altimeter, or a GPS device. If the portable computing device 102 determines that the tilt angle 108 has a certain magnitude, then an autofocus scan range algorithm may be selected. The autofocus scan range algorithm may be set as the default autofocus scan range algorithm for a current image capture or for a future image capture. A focus setting of at least one camera may be set based at least in part on the default autofocus scan range algorithm. For example, a tilt angle 108 may be determined to be 45 degrees from the horizontal axis 101. Based on the determined tilt angle, an autofocus scan range algorithm may be selected or adjusted. In the example shown in FIG. 1A, where the tilt angle is less than 90 degrees with respect to the axis 101 that is perpendicular to the direction of gravity 103, the autofocus scan range algorithm may be selected or adjusted to optimize autofocusing. For example, when the tilt angle is in a range of from 0 to 90 degrees with respect to the axis 101, the user may be deemed most likely to be attempting to photograph an object within a near-field range. A near-field range may be a range of from about 0 centimeters to about 1 centimeter, from about 1 centimeter to about 5 centimeters, or from about 5 centimeters to about 1 meter. As discussed in greater detail herein, the portable computing device 102 may also have object recognition capabilities. The object recognition capabilities may be used to determine whether an object is within a field of view of the camera 106. If no object is recognized within the field of view of the camera 106, the autofocus scan range algorithm may be selected or adjusted to optimize autofocusing at a greater distance from the camera 106.

Still referring to FIG. 1A, the camera 106 of the portable computing device 102 may capture an image of the object 105 and at least a portion may be displayed on a display screen of the portable computing device 102. In order to obtain more information about the object 105, the portable computing device 102 may access a library of recognized, predetermined images stored in a memory accessible to the portable computing device 102. The recognized, predetermined images may contain data concerning the characteristics of the objects in the images. If an object of a known size is recognized, then a distance from the camera to the object may be determined. Based on the distance, an autofocus scan range algorithm may be selected or adjusted.

According to various embodiments, the data may include dimensional data relative to distances from the camera 106 of the portable computing device 102. For example, the data may include a first image of a particular object at a distance of 1 cm from the camera, a second image of the object at a distance of 2 cm from the camera, etc. As a more specific, but non-limiting example, the data may include images of a finger at a plurality of distances from the camera, such as 1 cm, 2 cm, 5 cm, and 10 cm. The images of a finger at a plurality of distances from the camera may indicate a scale of a typical human finger relative to the camera 106 of the portable computing device 102 at each of the plurality of distances. Upon capturing an image of an object, and recognizing the object as a human finger, the portable computing device 102 may then compare the image capture of a finger to the data contained in the library. If the image capture of the finger is larger than the library finger image at 10 cm from the camera, then the portable computing device 102 determines that the finger in the image capture is closer than 10 cm from the camera 106.

Additionally or alternatively, the data may include relative dimensions between a plurality of recognizable points on an object. An object may be recognized and a distance between the object and the camera can be determined, if a sufficient number of the recognizable points are detected in an image of an object. The distance from the camera to the object may be calculated based on a comparison of the distances between the recognizable points in the image of the object and the relative dimensions stored in the data through a process of triangulation.

Figure 1B:
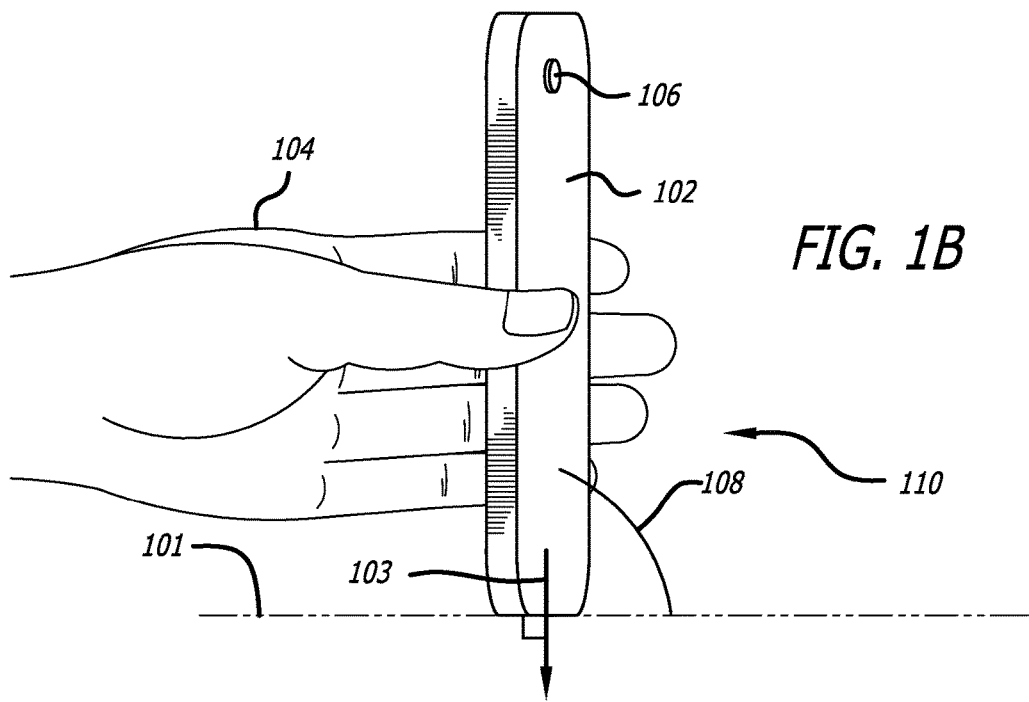

FIG. 1B is a schematic diagram, illustrating an exemplary situation 110 wherein a user 104 is holding a portable computing device 102 vertically, i.e. at a tilt angle that is parallel to a direction of gravity 103. In this example, the user 104 may be pointing the portable computing device 102 at an object (not shown) that is not in close proximity to the camera 106. The portable computing device 102 may determine a tilt angle of the portable computing device 102 relative to a direction of gravity 103 through at least one sensor, such as but not limited to, an accelerometer, a gyroscope, an altimeter, or a GPS device. The portable computing device 102 may determine that the tilt angle is approximately vertical, i.e. aligned with or parallel to a direction of gravity. Based on the determined tilt angle, an autofocus scan range algorithm may be selected or adjusted. In the example shown in FIG. 1B, where the tilt angle is approximately 90 degrees with respect to the axis 101 that is perpendicular to the direction of gravity 103, the autofocus scan range algorithm may be selected or adjusted to optimize autofocusing. For example, when the tilt angle is about 90 degrees with respect to the axis 101, the user may be deemed most likely to be attempting to photograph an object within a mid-field range. A mid-field range may be a range of from about from about 1 meter to about 3 meters, or from about 3 meters to about 9 meters. As discussed in greater detail herein, the portable computing device 102 may also have object recognition capabilities. The object recognition capabilities may be used to determine whether an object is within a field of view of the camera 106. If no object is recognized within the field of view of the camera 106, the autofocus scan range algorithm may be selected or adjusted to optimize autofocusing at a greater distance from the camera 106.

Figure 1C:
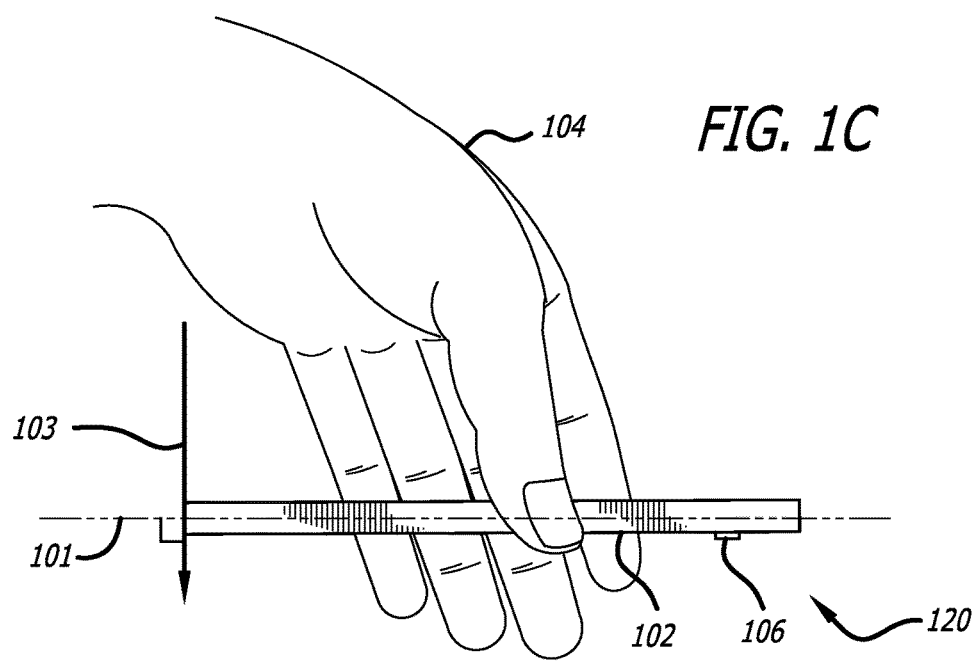

FIG. 1C is a schematic diagram, illustrating and exemplary situation 120 wherein a user 104 is holding a portable computing device 102 at tilt angle that is approximately perpendicular to a direction of gravity 103, i.e., parallel to the axis 101 that is perpendicular to a direction of gravity 103. In this example, the user 104 may be pointing the portable computing device 102 at an object (not shown) that is in close proximity to the camera 106. The portable computing device 102 determines the tilt angle of the portable computing device 102 relative to the axis 101 or relative to a direction of gravity 103 through at least one sensor, such as but not limited to an accelerometer, a gyroscope, an altimeter, or a GPS device. The portable computing device 102 may determine that the tilt angle is approximately perpendicular to a direction of gravity.

Figure 1D:
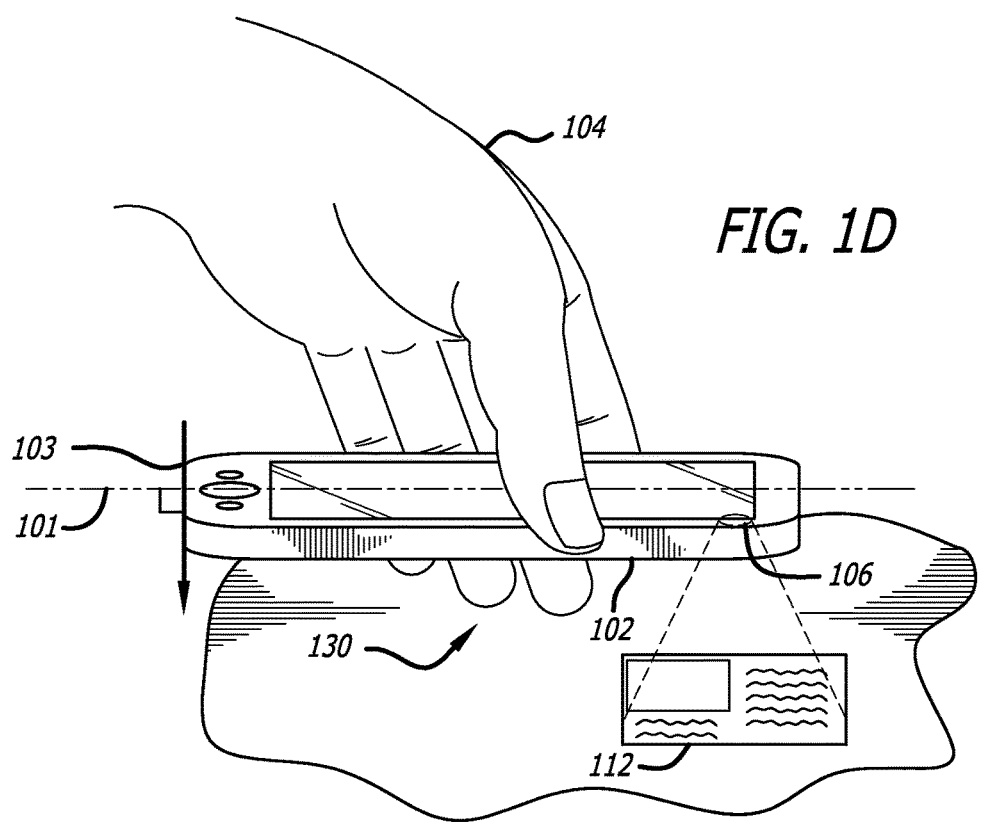

FIG. 1D is a schematic diagram illustrating an exemplary situation 130 wherein a user 104 is holding a portable computing device 102 approximately horizontal relative to a direction of gravity 103, or parallel to an axis 101, to point the camera 106 at an object 112. In this example, the user 104 may be pointing the portable computing device 102 at an object 112, such as a business card that is in close proximity to the camera 106. In order to obtain more information about the object 112, the portable computing device 102 may access a library of recognized, predetermined images stored in a memory accessible to the portable computing device 102. The recognized, predetermined images may contain data concerning the characteristics of the objects in the images. If an object of a known size is recognized, then a distance from the camera to the object may be determined. Additionally or alternatively, the portable computing device 102 may utilize applications or software to identify and perform actions on objects if the field of view of the camera 106. For example, an application such as AMAZON FIREFLY® from Amazon Technologies, Inc. allows the portable computing device 102 to attempt to identify an object by placing it in the field of view of the camera 106. If the AMAZON FIREFLY® application identifies the object, the application creates a digital representation called a digital entity. A digital entity is made of one or more facets, each of which describes an aspect of the identified object. For example, if the identified object is a book, the digital entity includes a book facet, which includes such information as the title, author(s), publisher, release date, and other information. If the book is available for sale, the digital entity also contains a product details facet, which includes information relevant to purchasing the book, such as price, ratings, and item number. Based on the distance or other information about the object, an autofocus scan range algorithm may be selected or adjusted. The portable computing device 102 may determine a tilt angle of the portable computing device 102 relative to a direction of gravity through at least one sensor, such as but not limited to an accelerometer, a gyroscope, an altimeter, or a GPS device. In this example, the portable computing device 102 is being held at a tilt angle that is approximately perpendicular to a direction of gravity. The portable computing device 102 may determine that the tilt angle is approximately perpendicular to a direction of gravity.

Based on the determined tilt angle, an autofocus scan range algorithm may be selected or adjusted. In the example shown in FIG. 1C or FIG. 1D, where the tilt angle is about parallel to the direction of gravity 103, the autofocus scan range algorithm may be selected or adjusted to optimize autofocusing. For example, when the tilt angle is in a range of from +/−10 degrees from parallel to a direction of gravity, the user may be deemed most likely to be attempting to photograph an object within a micro-field range. A micro-field range may be a range of from about 0 centimeters to about 1 centimeter, from about 1 centimeter to about 10 centimeters, or from about 10 centimeters to about 20 centimeters. As discussed in greater detail herein, the portable computing device 102 may also have object recognition capabilities. The object recognition capabilities may be used to determine whether an object is within a field of view of the camera 106. If no object is recognized within the field of view of the camera 106, the autofocus scan range algorithm may be selected or adjusted to optimize autofocusing at a greater distance from the camera 106.

Figure 1E:
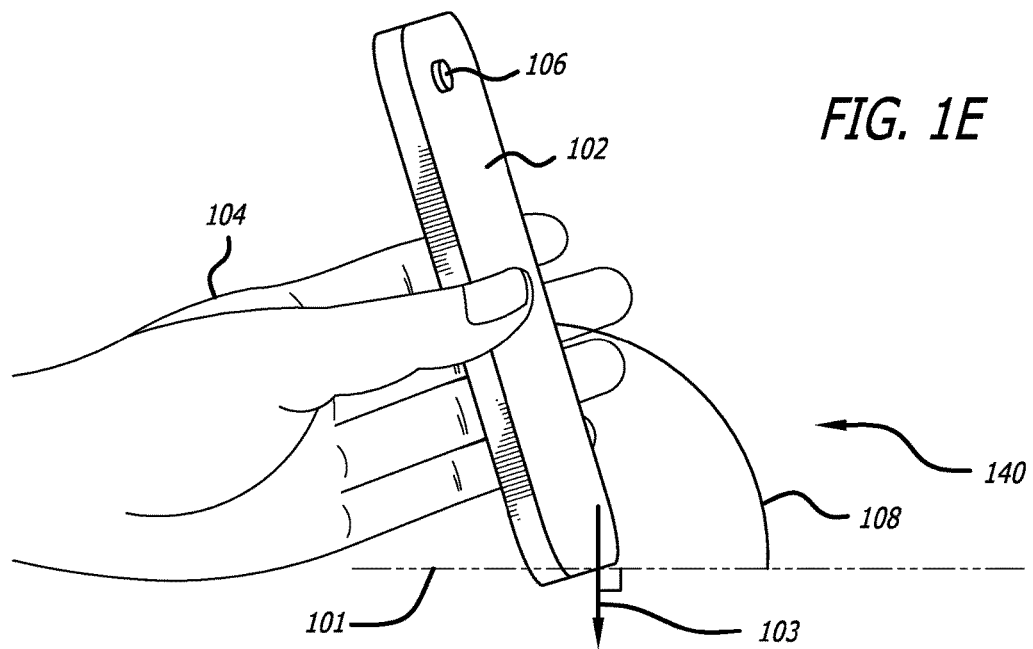

FIG. 1E is a schematic diagram illustrating an exemplary situation 140 wherein a user 104 is holding a portable computing device 102 at a tilt angle 108 relative to an axis 103 that is perpendicular to a direction of gravity 101. In this example, the user 104 may be pointing the portable computing device 102 at an object (not shown) that is distant to the camera 106, such as 1 m, 10 m, or 100 m away. As illustrated, in this example, the tilt angle 108 can be about 120 degrees. The portable computing device 102 may determine the tilt angle 108 of the portable computing device 102 relative to the axis 103 through at least one sensor, such as but not limited to an accelerometer, a gyroscope, an altimeter, or a GPS device. Based on the determined tilt angle, an autofocus scan range algorithm may be selected or adjusted. In the example shown in FIG. 1E, where the tilt angle is about greater than 90 degrees with respect to the axis 101 that is perpendicular to a direction of gravity 103, the autofocus scan range algorithm may be selected or adjusted to optimize autofocusing. For example, when the tilt angle is in a range of from 90 to 180 degrees with respect to the axis 101 that is perpendicular to a direction of gravity 103, the user may be deemed most likely to be attempting to photograph an object within a far-field range. A far-field range may be a range of from about 10 meters to about 100 meters, from about 100 meters to a maximum focal distance of the camera 106. As discussed in greater detail herein, the portable computing device 102 may also have object recognition capabilities. The object recognition capabilities may be used to determine whether an object is within a field of view of the camera 106. If no object is recognized within the field of view of the camera 106, the autofocus scan range algorithm may be selected or adjusted to optimize autofocusing at a greater distance from the camera 106.

Figure 1F:
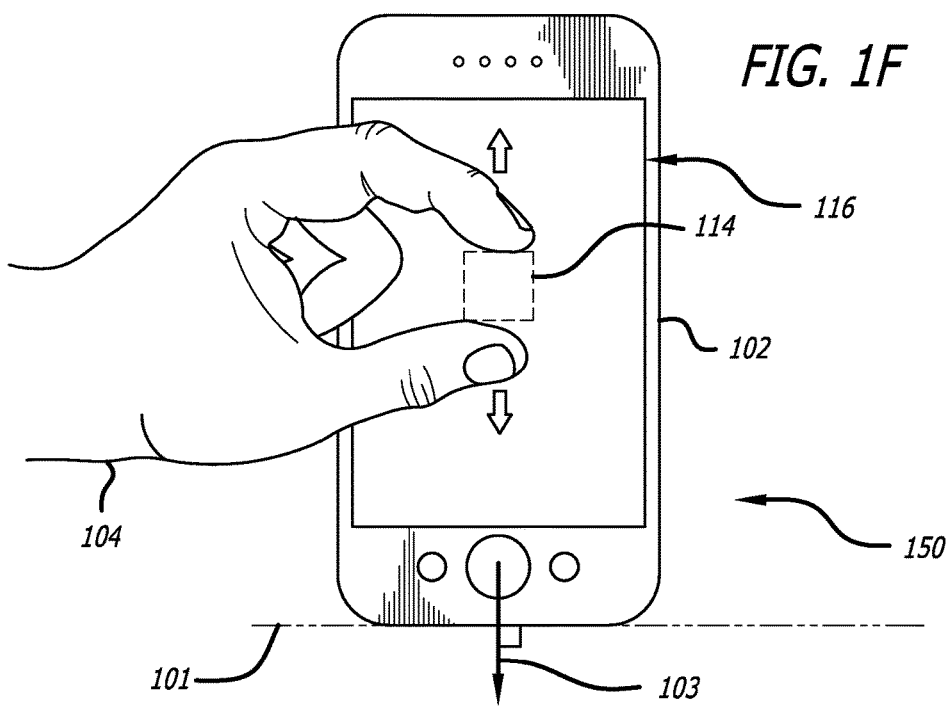

FIG. 1F is a schematic diagram illustrating an exemplary situation 150 wherein a user 104 is holding a portable computing device 102. The user 104 is using a thumb and a finger to perform a pinch gesture, creating a zoom window 114 on display screen 116. In this example, the user 104 is providing input to the portable computing device 102 through the display screen 116. When the user 104 points the camera of the portable computing device 102 at a particular object, an image of the particular object may be visible on the display screen 116. The particular object may be among one or more other objects at a variety of distances to the camera of the portable computing device 102. The user 104 may use a pinch gesture to generate a zoom window 114 on the display screen 116 over a particular portion thereof. The particular portion may contain, for example, the particular object that the user 104 intends to photograph. Based on the determined tilt angle and a determined distance to the particular object within the zoom window 114, an autofocus scan range algorithm may be selected or adjusted as already described. If a touch gesture is detected on the touch of the portable computing device 102, this may indicate that the object is at a distance and the user is attempting to enlarge the image of the object for optimal view, therefore, the detection of the pinch gesture may be a factor in determining the selection or adjustment of the autofocus scan range algorithm.

Figure 1G:
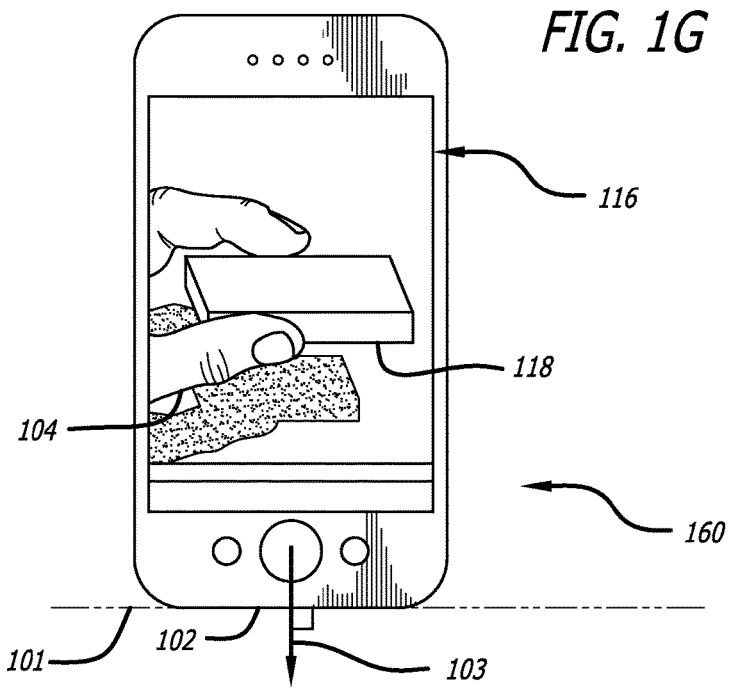

FIG. 1G is a schematic diagram illustrating an exemplary situation 160 wherein a user 104 is holding an object 118 with a thumb and finger in front of a portable computing device 102. The camera 106 of a portable computing device 102 is directed at the finger and thumb of the user 104 and an unrecognized object 118, visible on display screen 116. In this example, the user 104 may be pointing the portable computing device 102 at an object close to the camera 106 of the portable computing device 102, at a distance, such as 1 cm, 2 cm, or 5 cm away. In a case where at least one object is not recognized, the portable computing device 102 may attempt to determine a distance to the unrecognized object 118 based on other data or information captured in the image, for example, a finger, a recognized object, or a shadow.

Once the autofocus scan range algorithm has distance to the unrecognized object, the lens of the camera 106 of the portable computing device 102 may adjust or select an autofocus scan range algorithm based on the distance to the unrecognized object and/or based on the other data or information captured in the image. In this example illustrated in FIG. 1G, the camera 106 may identify one or more fingers disposed in close proximity to the unrecognized object 118. According to various embodiments it may be assumed that a user's fingers can only be so far away from the portable computing device 102, therefore, the user may be deemed most likely to be attempting to photograph an object within a near-field or micro-field range. For example, a range within 1 meter, which may be the typical length of an arm.

Figure 2A:
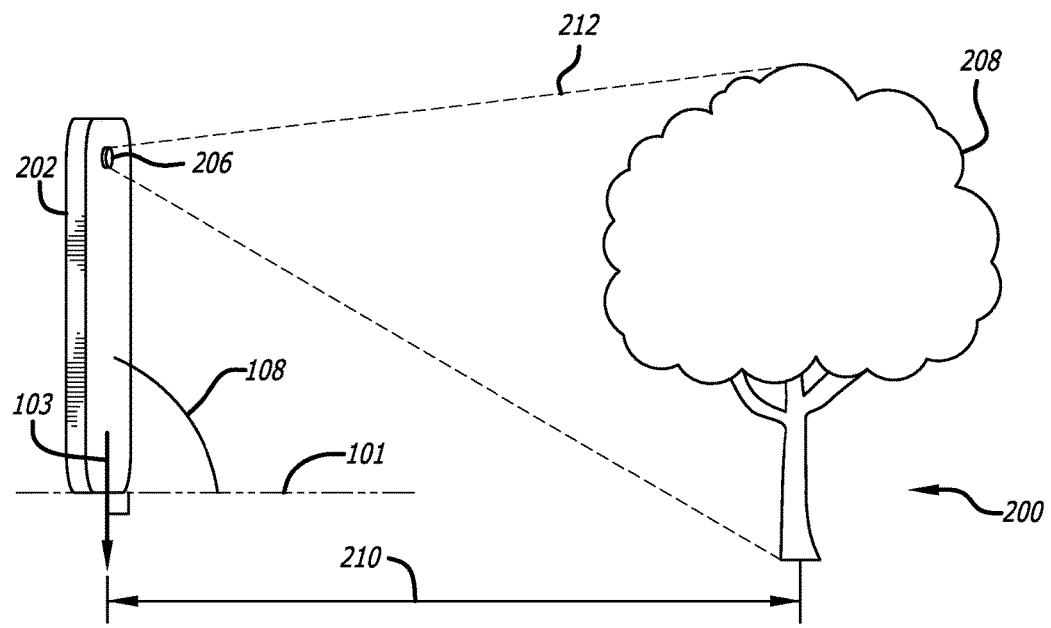
FIGS. 2A and 2B are schematic diagrams, illustrating examples of situations of a portable computing device capturing images of objects.

FIG. 2A is a schematic diagram illustrating an exemplary situation 200 wherein a portable computing device 202 with a camera 206 is directed at an object 208 a distance 210 away. The distance 210 may optionally be determined as described in any of the preceding embodiments. The ideal focal length 212 is represented from the camera 206 to the object 208. The ideal focal length 212 may be a focal length at which the object 208 is in an optimized focus. The portable computing device 202 determines the tilt angle 108 of the portable computing device 202 relative to an axis 101 perpendicular to a direction of gravity 103 via at least one sensor, such as but not limited to an accelerometer, a gyroscope, an altimeter, or a GPS device. In this example, the portable computing device 202 is approximately parallel with a direction of gravity 103. In other words, the portable computing device 202 has a tilt angle 108 of about 90 degrees with respect to an axis 101 that is perpendicular to a direction of gravity 103. An autofocus scan range algorithm may be selected or adjusted based at least in part on the tilt angle, so that a focus setting of the camera 206 is determined. The autofocus scan range algorithm may select or scale an initial focal length that is greater than or less than the ideal focal length 212 and adjust the initial focal length by a focal length adjustment increment until arriving at the ideal focal length 212. The initial focal length and/or the focal length adjustment increment may be selected or scaled based at least in part on the tilt angle 108 and/or the distance 210. Once the focus setting of the camera 206 has been determined, the camera 206 may capture at least one image of the object 208.

The camera 206 of the portable computing device 202 may capture at least one image of the object 208 and at least a portion of the object 208 may be displayed on a display screen of the portable computing device 202. In order to obtain more information about the object 208, the portable computing device 202 may access a library of recognized, predetermined images stored in various locations, such as on the portable computing device 202, or on a remote server or data storage device. The recognized, predetermined images may contain data concerning the characteristics of the objects in the images. For example, the data may include dimensional data relative to distance 210 from the camera 206 of the portable computing device 202. Additional data may include biographical or technical information, such as product information, price, and user ratings. At least one image of the object 208, such as a tree, may be included in the library of recognized, predetermined images. The distance data for the object 208 may be for example, 10 m, indicating a scale of a typical tree to the camera 206 of the portable computing device 202 at a distance of 10 m. The portable computing device 202 may then compare the image capture of a tree to the tree data contained in the library of the portable computing device 202. If the image capture of the object 208 is larger than the library tree image, then the portable computing device 202 determines that the tree object 208 in the at least one captured image is closer than 10 m from the camera 206.

Figure 2B:
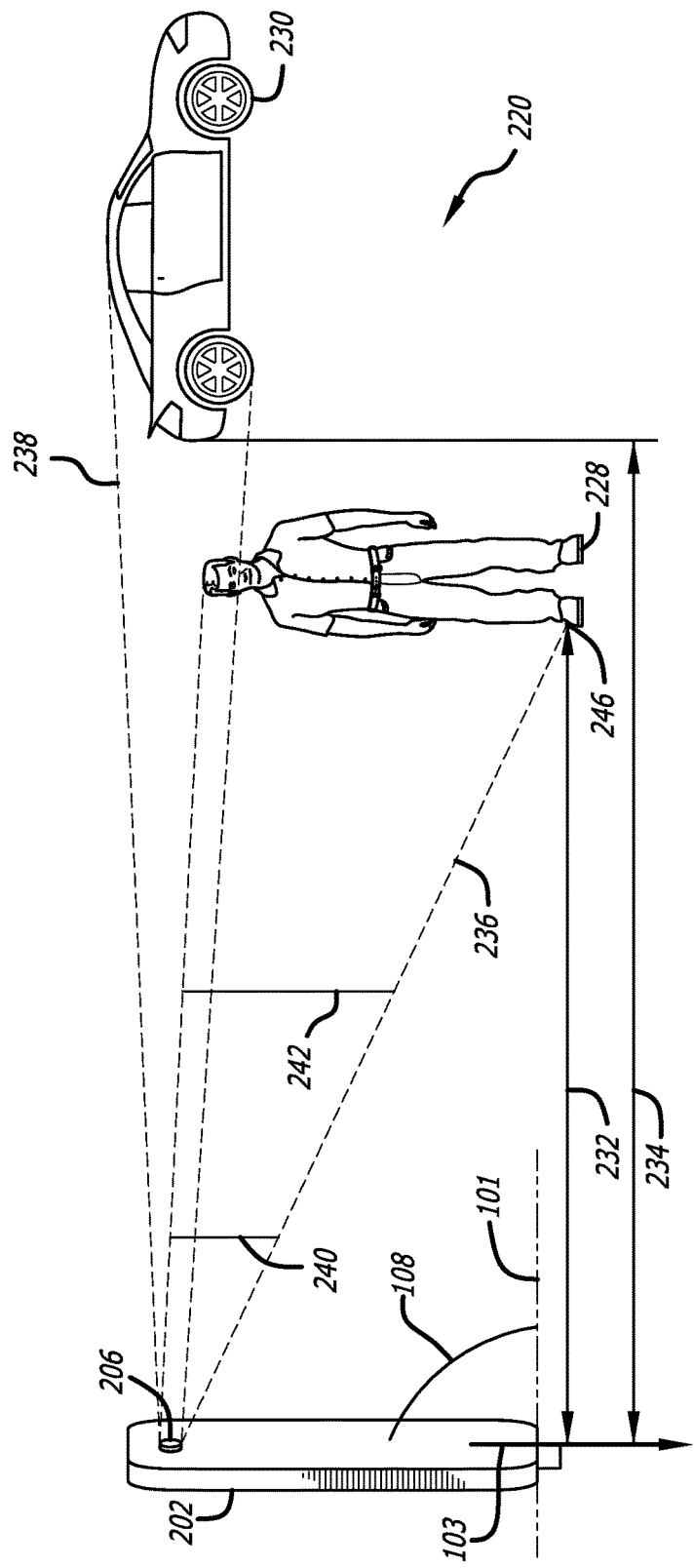

FIG. 2B is a schematic diagram of an exemplary situation 220 wherein a portable computing device 202 with a camera 206 is directed at a person 228 and a vehicle 230 at distances 232 and 234, respectively. The focal length 236 is represented from the camera 206 to the person 228. The focal length 238 is represented from the camera 206 to the vehicle 230. The portable computing device 202 determines the tilt angle of the portable computing device 202 relative to an axis, as described above, such as a direction of gravity 103 or relative to an axis 101 perpendicular to a direction of gravity 103. The tilt angle 108 may be determined using at least one sensor, such as but not limited to an accelerometer, a gyroscope, an altimeter, or a GPS device. In this example, the portable computing device 202 is approximately vertical, i.e. parallel to a direction of gravity 103. Once the portable computing device 202 has determined that the tilt angle is approximately vertical, an autofocus scan range algorithm is selected from a plurality of tilt angle ranges based at least on the tilt angle 108. The autofocus scan range algorithm may be set as the default autofocus scan range algorithm for an image capture. Alternatively, the autofocus scan range algorithm may be used at least momentarily before another autofocus scan range algorithm is selected. In either situation, a focus setting of at least one camera 206 is based at least in part on an autofocus scan range algorithm.

In this example, the camera 206 of the portable computing device 202 may capture an image of the person 228 and the vehicle 230 and at least a portion of the person 228 and the vehicle 230 may be displayed on a display screen of the portable computing device 202. In order to obtain more information about the person 228 and the vehicle 230, the portable computing device 202 may access a library of recognized, predetermined images stored on the portable computing device 202. The recognized, predetermined images contain data concerning the characteristics of the objects in the images. For example, the data may include dimensional data relative to distances 232 and 234, respectively, from the camera 206 of the portable computing device 202. At least one image of the person 228 and the vehicle 230 may be included in the library of recognized, predetermined images. The distance data for the person 228 may be for example, 10 m, indicating a scale of a typical person to the camera 206 of the portable computing device 202 at a distance of 10 m. The portable computing device 202 may then compare the image capture of the person 228 to the person data contained in the library of recognized, predetermined images of the portable computing device 202. If the image capture of the person 228 is larger than the library person image, then the portable computing device 202 determines that the person 228 in the image capture is closer than 10 m from the camera 206. Similarly, the distance data for the vehicle 230 may be for example, 15 m, indicating a scale of a typical vehicle to the camera 206 of the portable computing device 202 at a distance of 15 m. The portable computing device 202 may then compare the image capture of the vehicle 230 to the vehicle data contained in the library of recognized, predetermined images of the portable computing device 202. If the image capture of the vehicle 230 is larger than the library vehicle image, then the portable computing device 202 determines that the vehicle 230 in the image capture is closer than 15 m from the camera 206.

Examples of camera focus devices include voice coil motor (VCM), piezo-electric motor (PE), stepper motor, micro-electro-mechanical systems (MEMS) and liquid crystal (LQ) devices. Some camera focus devices such as PE may incorporate a position sensor, typically a Hall effect sensor that may provide an absolute readout of the lens position that may be correlated to a particular distance to the plane of focus. Other camera focus devices such as VCM and LQ typically do not have a position sensor; in these systems the focal distance may be inferred from the state of the camera focus device, i.e., the drive current or voltage. This may require calibration at the time manufacture. In some embodiments, absolute distance is not of great concern, rather the relative distance is desired, for example to determine superposition. In this case, indirect measurement of the camera focus distance will not require calibration.

The sensitivity of the focal distance determination will be dependent at least in part on two system properties: the depth of field of the lens and the accuracy and/or precision with which the lens position may be determined. The depth of focus is dependent at least in part on the magnification of the lens and on the lens aperture. All of these properties are known when the system is designed and may be used to determine the precision to which focal distance may be determined and optimized if need be.

In some embodiments, the autofocusing process may start by causing an autofocus processor (AFP) to make a small change in the focusing distance of a lens of the camera. The AFP may then read the autofocus (AF) sensor to assess whether or not (and if so, by how much) focus has improved in an image captured at the focusing distance. Next, using the information from the assessment, the AFP may set the lens of the camera to a new focusing distance (e.g., a new focus setting) and capture another image at the new focusing distance. The AFP may iteratively repeat these steps until satisfactory focus has been achieved.

The autofocusing process may usually finish within a short period of time, such as a fraction of a second. The autofocus process results in determining a focus setting of the camera (e.g., a focus distance of the lens of the camera) that provides a satisfactory focus and/or sharpness for an area of interest in the image to be captured. Typically, the images captured (temporarily) at the other focus distances during the autofocus process are discarded. However, in according with various embodiments of the present disclosure, the image captured at the other focus distances during the autofocus process need not be discarded, but instead may be utilized for depth determination.

The camera begins to capture of a plurality of images, beginning at a predetermined start point and ending at a predetermined end point. The portable computing device determines distance or depth information based at least in part on the focus setting of the camera. In each image, at least a portion of at least one object is identified and assigned a sharpness score exceeding a sharpness threshold. The sharpness score indicates the amount of image detail conveyed dependent at least in part on the focus setting associated with the camera. A position of depth is determined associated with at least the identified portion of the at least one object, in each image captured by the camera, based on the depth information for each image.

In some embodiments, an object may be determined by the portable computing device to be in focus (which may depend on the particular focus setting of the camera when the image is captured). The portable computing device may utilize image processing (e.g., edge detection, line detection, feature detection, etc.) to determine that the object in the image is substantially sharp. In other words, the portable computing device may utilize image processing to determine that the object in the image has a sharpness level that exceeds a sharpness threshold. In some embodiments, the sharpness level may be a sharpness score and the sharpness threshold may be sharpness score threshold.

Based on the state of the camera such as the focus distance of the lens of the camera and/or the magnification setting of the camera when the image is captured, the portable computing device may determine that the object of the focus in the image has a depth that is substantially far away from the camera; the depth may be a relative depth with respect to at least another image (e.g., relative to another object(s) of focus in another image(s)). In some embodiments, at least two images are captured with different camera focus settings.

The portable computing device may determine depth information associated with the image based on the state of the camera when the image is captured. For example, based on the focus setting (e.g., focus distance of the lens) of the camera, the magnification setting of the camera, and/or state information associated with the camera when the image is captured, the portable computing device may determine depth information associated with the image (and/or object(s) of focus in the image).

The portable computing device may determine the object(s) of focus in the image, wherein the object(s) of focus is dependent at least in part on the focus setting of the camera when the image is captured. For example, the portable computing device may determine that the objects of focus for the image are two objects that are relatively close together. The portable computing device may utilize image processing to determine that the objects are substantially in focus (e.g., substantially sharp) as compared to the rest of the image, which is out of focus (e.g., blurry). The portable computing device may determine depth information associated with the image (i.e., associated with the objects of focus in the image).

In some embodiments, the objects in the plurality of the images may optionally be "placed" on (e.g., mapped to, associated with, etc.) a plurality of virtual depth planes. In some embodiments, the portable computing device may optionally generate a plurality of virtual depth planes such that each plane representing an area at a particular distance in depth away from the camera. The number of virtual depth planes does not have to equal the number of images; there may be more or less virtual depth planes than images. The computing device may associate (e.g., "place") each of the objects in the plurality of images with an appropriate virtual depth plane depending on the depth information (e.g., depth rank, depth position) associated with each object. In some cases, multiple objects may be placed/mapped onto (associated with) a single virtual depth plane. In some cases, some virtual depth plane may include (be associated with) no objects. In some embodiments, an object (i.e., or a portion thereof) may be associated with a virtual plane by tagging the object (or portion) with information that indicates that the object (or portion) is virtually located at the virtual plane.

In some embodiments, the virtual depth planes may be utilized to sort the plurality of images and/or the objects in the plurality of images. In some embodiments, the sorting may occur priorly and the generating of the virtual depth planes may depend on the sorting. In some embodiments, the virtual depth planes may be utilized to build a depth map for the images and/or the objects in the images.

In some embodiments, the objects of focus from the plurality of images may be placed together to form an image/rendering (i.e., graphical representation) in which all of these objects are in focus. For example, in some embodiments, all of the objects in the image/rending may be in focus and/or have a sharpness level above a sharpness threshold.

The portable computing device may recognize one or more objects, utilizing object recognition technology (including facial detection and/or recognition), within a field of view of the camera of the device. For the recognized objects, the portable computing device may provide information about the objects. In some embodiments, the portable computing device may render/display graphical elements on a display screen in conjunction with the objects within the field of view of the camera. Each graphical element may provide information (or access to information) about an object with which the respective element is associated. For example, an element associated with an object may provide a link to information about the object that may be accessed by a user interaction (e.g., tapping on the link).

In some embodiments, the elements may be rendered in accordance with the depths associated with the objects. Rendering multiple elements on the display screen of the portable computing device may lead to clutter and/or an inconvenient user interface. As such, based at least in part on the depths associated with the objects, the rendering of the elements may be adjusted. For example, elements associated with objects in the front may superimpose and be larger than elements associated with objects in the back.

It should be understood that there may be additional, fewer, or alternative steps performed in similar or alternative orders, or in parallel, within the scope of the various embodiments unless otherwise stated. In some embodiments, the example method embodiment may start with capturing images during an autofocus of the camera, each image being captured with a different camera focus setting. The example method may also determine a virtual depth plane (i.e., virtual plane) for each image based on a focus distance of a camera lens when the image is captured.

In some embodiments, the portable computing device may rank the plurality of images (i.e., rank the objects in the plurality of images) based on depth. For example, the portable computing device may determine that out of the plurality of images captured, the object(s) of focus in the image associated with the farthest depth may have the highest depth rank, such as being first in a sequential order that ranks the objects in the images from farthest away from the camera to the closet. The object(s) of focus in the image associated with the next farthest depth may have the next highest depth rank. Finally, in this example, the closest object may have the last depth rank.

In some embodiments, the portable computing device may generate a depth map which indicates relative depths for the objects in the plurality of images. For example, the depth map may indicate locations of the objects in a field of view of the camera and indicating relative positions of depth for the objects. In some embodiments, the depth map may be generated based in part on comparing positions in a sequential order of depth (e.g., depth ranks) for the objects. In some embodiments, the depth map may be generated for a plurality of fields of view of the camera joined together.

In some embodiments, one or more orientation sensors of the portable computing device may be utilized at least in part to determine a direction at which the camera of the portable computing device is pointed. The generating of the depth map may be based at least in part on the direction at which the camera is pointed. The one or more orientation sensors may include (but is not limited to) an accelerometer, a gyroscope, an electronic compass, or a magnetometer.

In some embodiments, if a depth cannot be determined for an object, then the depth for the object may be estimated from the depth of a nearby object. For example, if the confidence of the depth determination for an object is low, then the determining of the depth for the object may include utilizing at least in part a determined a depth for an object within an allowable distance of the former object.

In some embodiments, identifying an object(s), in each of the plurality of images, that has a sharpness score (i.e., sharpness level) exceeding a sharpness score threshold (i.e., sharpness level threshold, sharpness threshold) may be based on at least one of rise distance evaluation, contrast evaluation (e.g., increase resolution and evaluate contrast), fractal dimension evaluation, edge detection, line detection, shadow detection, feature detection, and/or other suitable image processing algorithms.

In some embodiments, information about an object may be retrieved via a network from a server external to the portable computing device. In some embodiments, at least some of the processing performed by the portable computing device may be performed by the server instead.

The portable computing device may include at least one orientation sensor, such as a position and/or movement-determining element. Such a sensor may include, for example, an accelerometer or gyroscope operable to detect an orientation and/or change in orientation of the portable computing device relative to gravity, as well as small movements of the device. An orientation sensor also may include an electronic or digital compass, which may indicate a direction (e.g., north or south) in which the portable computing device is determined to be pointing (e.g., with respect to a primary axis or other such aspect). An orientation sensor also may include or comprise a global positioning system (GPS) or similar positioning element operable to determine relative coordinates for a position of the portable computing device, as well as information about relatively large movements of the portable computing device. Various embodiments may include one or more such elements in any appropriate combination. As should be understood, the algorithms or mechanisms used for determining relative position, orientation, and/or movement may depend at least in part upon the selection of elements available to the portable computing device.

In some embodiments, the portable computing device may include one or more communication elements (not shown), such as a Wi-Fi, Bluetooth, RF, wired, or wireless communication system. The portable computing device in many embodiments may communicate with a network, such as the Internet, and may be able to communicate with other such devices. In some embodiments the portable computing device may include at least one additional input device able to receive conventional input from a user. This conventional input may include, for example, a push button, touch pad, touch screen, wheel, joystick, keyboard, mouse, keypad, or any other such device or element whereby a user may input a command to the portable computing device. In some embodiments, however, such a device might not include any buttons at all, and might be controlled only through a combination of visual and audio commands, such that a user may control the device without having to be in contact with the portable device.

The portable computing device also may include at least one orientation or motion sensor. As discussed, such a sensor may include an accelerometer or gyroscope operable to detect an orientation and/or change in orientation relative to gravity, or an electronic or digital compass, which may indicate a direction in which the portable computing device is determined to be facing. The mechanism(s) also (or alternatively) may include or comprise a global positioning system (GPS) or similar positioning element operable to determine relative coordinates for a position of the portable computing device, as well as information about relatively large movements of the portable computing device. The portable computing device may include other elements as well, such as may enable location determinations through triangulation or another such approach. These mechanisms may communicate with the processor of the portable computing device, whereby the portable computing device may perform any of a number of actions described or suggested herein.

As an example, a portable computing device may capture and/or track various information for a user over time. This information may include any appropriate information, such as location, actions (e.g., sending a message or creating a document), user behavior (e.g., how often a user performs a task, the amount of time a user spends on a task, the ways in which a user navigates through an interface, etc.), user preferences (e.g., how a user likes to receive information), open applications, submitted requests, received calls, and the like. As discussed above, the information may be stored in such a way that the information is linked or otherwise associated whereby a user may access the information using any appropriate dimension or group of dimensions.

Figure 3A:
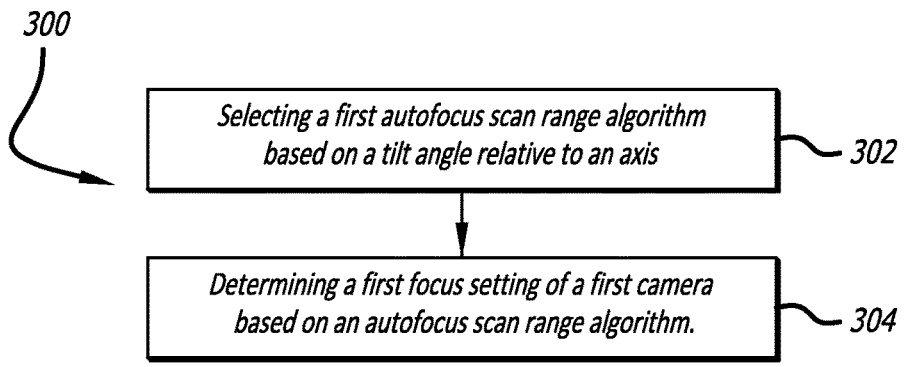
FIGS. 3A-3D are flow chart diagrams, illustrating exemplary processes for determining an autofocus scan range algorithm of a camera that may be used in accordance with various embodiments.

FIG. 3A is a flow chart of an exemplary process 300 in accordance with various embodiments. In this example, the portable computing device selects a first autofocus scan range algorithm based at least in part on a tilt angle relative to an axis, in step 302. The tilt angle is determined relative to gravity using at least one sensor, such as but not limited to an accelerometer, a gyroscope, an altimeter, or a GPS device. Once the portable computing device has determined the tilt angle relative to gravity in step 302, the portable computing device determines a first focus setting of a first camera based at least in part on the first autofocus scan range algorithm 304.

Figure 3B:
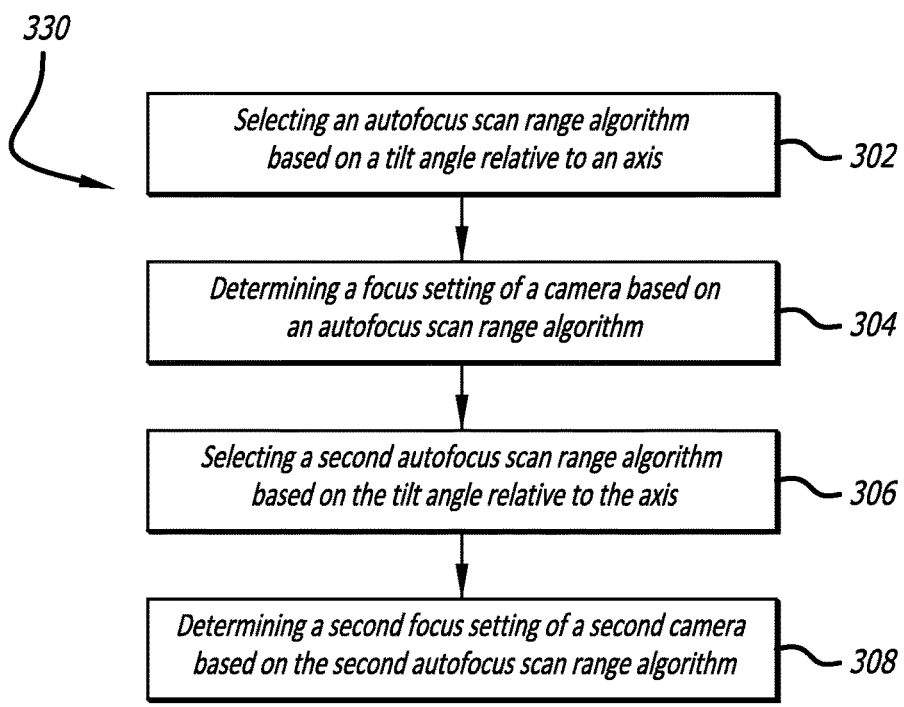

FIG. 3B is a flow chart of an exemplary process 310 in accordance with various embodiments. In this example, the portable computing device selects a first autofocus scan range algorithm based at least in part on a tilt angle relative to an axis 302. The tilt angle is determined relative to gravity using at least one sensor, such as but not limited to an accelerometer, a gyroscope, an altimeter, or a GPS device. Once the portable computing device has determined the tilt angle relative to gravity in step 302, the portable computing device determines a first focus setting of a first camera based at least in part on the first autofocus scan range algorithm 304. The portable computing device then selects a second autofocus scan range algorithm based at least in part on the tilt angle relative to the axis 306. The tilt angle may be the same tilt angle as that measured in step 302 or the tilt angle may be different from the earlier measurement, if for example, the portable computer device has changed position relative to the axis. The portable computing device then determines a second focus setting of a second camera based at least in part on the second autofocus scan range algorithm 308.

Figure 3C:
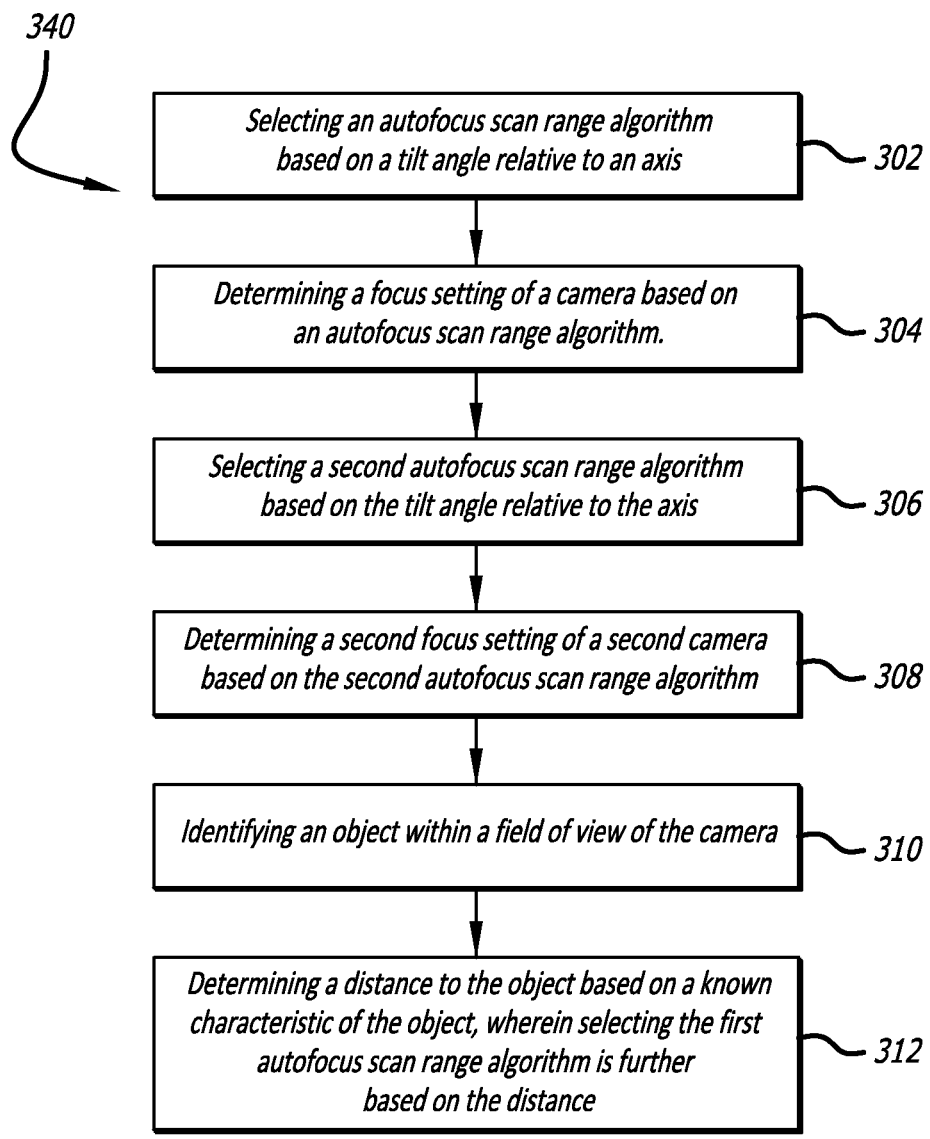

FIG. 3C is a flow chart of an exemplary process 320 in accordance with various embodiments. In this example, the portable computing device selects a first autofocus scan range algorithm based at least in part on a tilt angle relative to an axis 302. The tilt angle is determined relative to gravity using at least one sensor, such as but not limited to an accelerometer, a gyroscope, an altimeter, or a GPS device. Once the portable computing device as determined the tilt angle relative to gravity in step 302, the portable computing device determines a first focus setting of a first camera based at least in part on the first autofocus scan range algorithm 304. The portable computing device then selects a second autofocus scan range algorithm based at least in part on the tilt angle relative to the axis 306. The tilt angle may be the same tilt angle as that measured in step 302 or the tilt angle may be different from the earlier measurement, if for example, the portable computer device has changed position relative to the axis. The portable computing device then determines a second focus setting of a second camera based at least in part on the second autofocus scan range algorithm 308. The portable computing device then identifies an object within a field of view of the camera 312. The portable computing device compares the object in the field of view of the camera with a library of known objects. The library of known objects may be located in the memory of the portable computing device, or in other locations, such as but not limited to the Internet or in a cloud computing platform. Once the object has been identified, the portable computing device then determines a distance from the portable computing device to the object based at least in part on a known characteristic of the object, wherein selecting the first autofocus scan range algorithm is further based at least in part on the distance 314. Examples of known characteristics of the object include, but are not limited to, its shape, color, and its relationship to other objects.

Figure 3D:
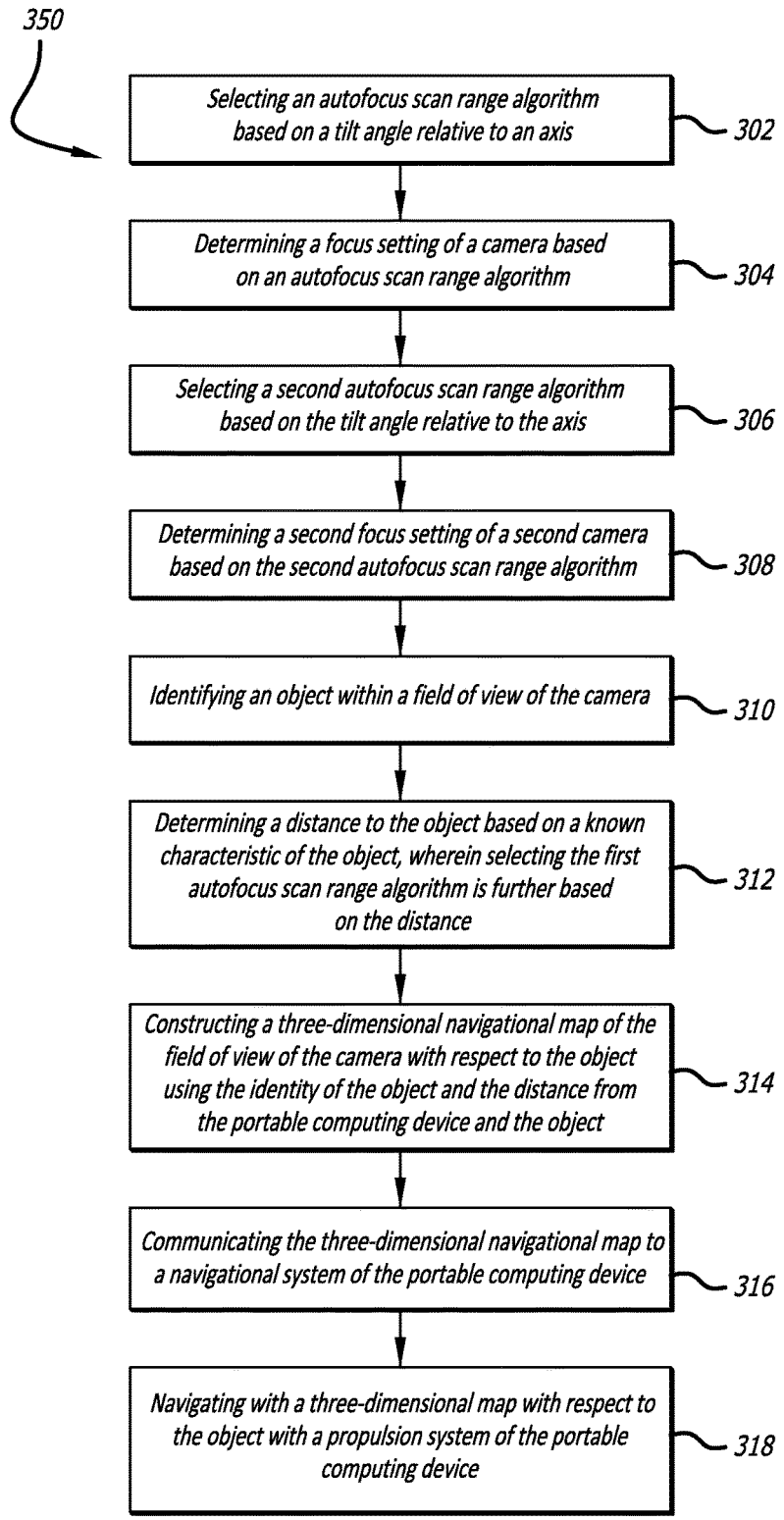

FIG. 3D is a flow chart of an exemplary process 320 in accordance with various embodiments. In this example, the portable computing device selects a first autofocus scan range algorithm based at least in part on a tilt angle relative to an axis 302. The tilt angle is determined relative to gravity using at least one sensor, such as but not limited to an accelerometer, a gyroscope, an altimeter, or a GPS device. Once the portable computing device as determined the tilt angle relative to gravity in step 302, the portable computing device determines a first focus setting of a first camera based at least in part on the first autofocus scan range algorithm 304. The portable computing device then selects a second autofocus scan range algorithm based at least in part on the tilt angle relative to the axis 306. The tilt angle may be the same tilt angle as that measured in step 302 or the tilt angle may be different from the earlier measurement, if for example, the portable computer device has changed position relative to the axis. The portable computing device then determines a second focus setting of a second camera based at least in part on the second autofocus scan range algorithm 308. The portable computing device then identifies an object within a field of view of the camera 312. Once the object has been identified, the portable computing device then determines a distance from the portable computing device to the object based at least in part on a known characteristic of the object, wherein selecting the first autofocus scan range algorithm is further based at least in part on the distance 314. Using the identification information, the portable computing device may determine the dimensions of the object. The portable computing device then constructs a three-dimensional navigational map of the field of view of the camera with respect to the object using the identity of the object and the distance from the portable computing device and the object 316. The portable computing device communicates the three-dimensional navigational map to a navigational system of the portable computing device 318. The portable computing system may then navigate with the at least three-dimensional map with respect to the object with a propulsion system 322.

The portable computing device may repeat the process of capturing an image of an identifying an object repeatedly and quickly, identifying additional objects in the field of view of the camera, determining their distance to the camera and their dimensions, and adding that information to the three-dimensional navigation map. If the field of view of the camera changes, additional objects not previously in the field of the view of the camera may be identified. By repeatedly identifying objects in the field of view of the camera, the portable computing device may gain even more information about the identified objects. For example, the portable computing device may determine if the distance between the camera and the portable computing device changes, i.e., whether the object is stationary, moving closer to or away from the camera. The portable computing device may further determine over a period of time, whether a particular object is stationary or not, if so, the frequency of image capture and identification may be reduced. On the other hand, if the object is determined to not be stationary, the portable computing device may increase the frequency of image capture and identification, which may require an additional autofocus scan range algorithm to be selected, depending upon but not limited to the rate of movement of the object to or from the camera, the capabilities of the camera, including its lens, optical properties, as well as ambient conditions. By determining the distance, or position, of objects over time, the portable computing device may efficiently allocate resources toward objects that are moving relative to the camera, or where the camera is moving relative to the objects, or both.

It should be understood that the camera 106 of the portable computing device 102 may be located in a variety of positions relative to the portable computing device 106. In some embodiments, the camera 102 is integrated into a portable computing device 106, such as a tablet or mobile phone. As such, the camera 106 is not typically removable and must travel with the portable computing device 102. Also, the field of view of the camera 106 may be limited by the remainder of the portable computing device 106, such as the exterior housing or additional elements such as mobile phone cases or covers which may further limit the field of view of the camera 102.

In other embodiments, the camera of the portable computing device may be located remotely from the portable computing device, while still maintaining an electronic connection, such as but not limited to a cable or wireless connection. For example, a portable computing device may also include a propulsion system that allows it to move, such as fly. The propulsion system may be of many types, some of which include a plurality of propellers. These propellers are typically located some distance apart for several reasons, not the least of which is to avoid propellers contacting one another while rotating and also to provide stability. These propellers however could interfere with the field of view of the camera of the portable computing device, which may be located centrally within these embodiments. Therefore, the camera may be located toward the perimeter when equipped with a propulsion system. The camera may also include additional movement features and/or lenses that allow it to have a large field of view, such as but not limited to a gimbal system, which may include additional gyro-stabilization.

FIG. 4A is a flow chart of an exemplary process 400 in accordance with various embodiments. In this example, the portable computing device determines a tilt angle relative to an axis 402. The axis may be based on gravity, for example, and determined using at least one sensor, such an as accelerometer, a gyroscope, an altimeter, or a GPS device. Once the portable computing device has determined its tilt angle relative to an axis, the device selects one of a plurality of predetermined tilt angle ranges based on the tilt angle 404. The portable computing device then selects an autofocus scan range algorithm based at least in part on the one of a plurality of predetermined tilt angle ranges 406. An autofocus scan range algorithm is set as the default autofocus scan range algorithm for an image capture 408. The portable computing device then determines a focus setting of at least one camera based at least in part on the default autofocus scan range algorithm 412.

FIG. 4B is a flow chart of an exemplary process 410 in accordance with various embodiments. In this example, the portable computing device determines a tilt angle relative to an axis 402. The axis may be based on gravity, for example, and determined using at least one sensor, such an as accelerometer, a gyroscope, an altimeter, or a GPS device. Once the portable computing device has determined its tilt angle relative to an axis, the device selects one of a plurality of predetermined tilt angle ranges based on the tilt angle 404. The portable computing device then selects an autofocus scan range algorithm based at least in part on the one of a plurality of predetermined tilt angle ranges 406. An autofocus scan range algorithm is set as the default autofocus scan range algorithm for an image capture 408. The portable computing device then determines a focus setting of at least one camera based at least in part on the default autofocus scan range algorithm 412. An object within a field of view of the camera is identified 414. The portable computing device then determines a distance from the device to the object based at least in part on a known characteristic of the object, wherein selecting the autofocus scan range algorithm is further based at least in part on the distance 416.

Figure 5:
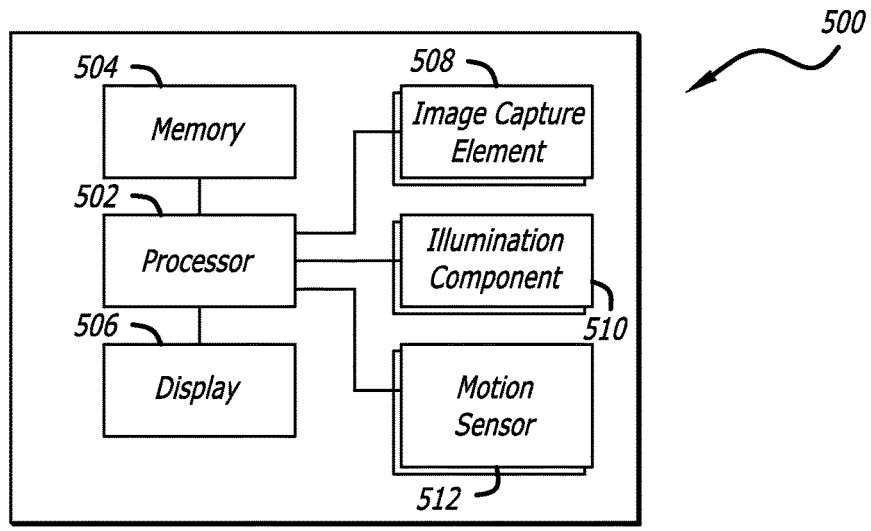
FIG. 5 is a schematic block diagram illustrating an exemplary configuration of components of a portable computing device such as illustrated in FIGS. 1A-1G.

In order to provide various functionality described herein, FIG. 5 illustrates an example set of basic components of a portable computing device 500, such as the device 102 described with respect to FIGS. 1A-1G. In this example, the device 500 includes at least one central processor 502 for executing instructions that may be stored in at least one memory device or element 504. The processor determines the proper autofocus scan range algorithm based at least upon the tilt angle, and object information. As would be apparent to one of ordinary skill in the art, the device may include many types of memory, data storage or non-transitory computer-readable storage media, such as a first data storage for program instructions for execution by the processor 502, the same or separate storage may be used for images or data, a removable storage memory may be available for sharing information with other devices, etc. The device 500 typically will include some type of display element 506, such as but not limited to a touch screen, electronic ink (e-ink), organic light emitting diode (OLED) or liquid crystal display (LCD), although other types of devices 500 may convey information via other means, such as through audio speakers. In at least some embodiments, the display element 506 provides for touch or swipe-based input using, for example, capacitive or resistive touch technology.

As discussed above, the device 500 in many embodiments will include at least one image capture element 508, such as but not limited to a camera that is able to image a user, people, or objects in the vicinity of the device 500. The image capture element 508 may include, or be based at least in part upon any appropriate technology, such as a CCD or CMOS image capture element having a determined resolution, focal range, viewable area, and capture rate. The image capture element 508 may include at least one IR sensor or detector operable to capture image information for use in determining motion or direction of a user, person, or objects. The example device 500 includes at least one motion determining component 512, such as but not limited to a gyroscope, used to determine motion of the device 500. The device 500 may also include a focus and/or exposure component, such as a local microprocessor and/or microcontroller. The focus/exposure determining component(s) may include code that may be executed to analyze distance information and use an autofocus scan range algorithm or other such approach to determine an appropriate focus setting for the image capture element 508 of the device 500. The focus/exposure determining component(s) may further include code that may be executed to analyze intensity data from a local light sensor or other such data from one or more sensors and use an automatic exposure control algorithm or other such approach to determine an appropriate exposure setting for the image capture element 508. The device 500 may also include at least one illumination element 510, as may include one or more light sources (e.g., white light LEDs, IR emitters, or flashlamps) for providing illumination and/or one or more light sensors or detectors for detecting ambient light and/or intensity, etc.

The example device 500 may include at least one input device able to receive input from a user. This input device may include but is not limited to a push button, touch pad, touch screen, wheel, joystick, keypad, mouse, trackball, or any other such device or element whereby a user may input a command to the device. These input devices may be connected wirelessly to the device, such as but not limited to wireless IR, Bluetooth™ or other link as well in some embodiments. In some embodiments, however, such a device might not include any input devices and may be controlled through a combination of visual (e.g., gesture) and audio (e.g., spoken) commands such that a user may control the device without having to be in physical contact with the device.

Figure 6:
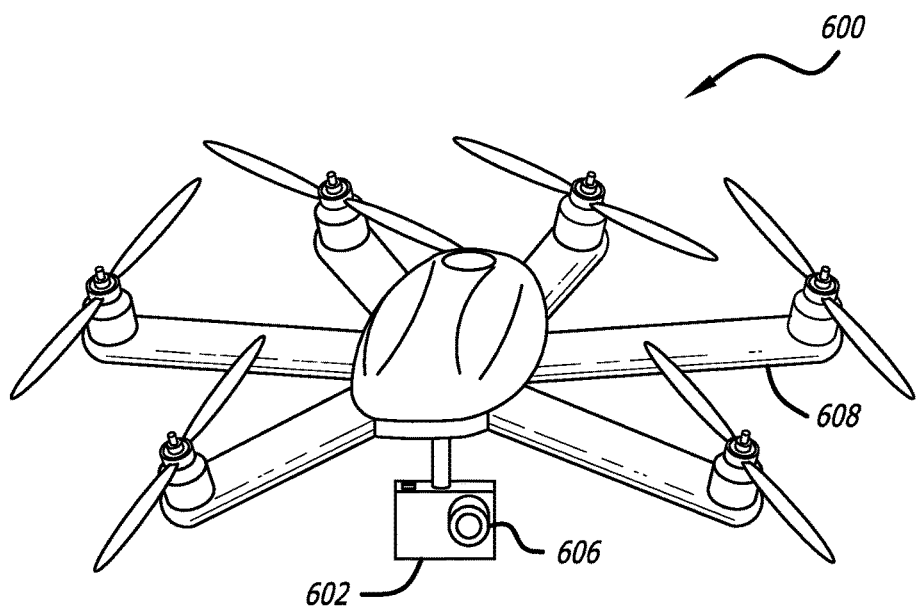
FIG. 6 is a schematic diagram illustrating an exemplary environment in which various embodiments may be implemented.

FIG. 6 is a schematic illustration of an exemplary situation 600 wherein a portable computing device 602 with a camera 606 is integrated with an autonomous vehicle, or drone 608. The portable computing device 602 determines the tilt angle of the portable computing device 602 relative to gravity through at least one sensor, such as but not limited to an accelerometer, a gyroscope, an altimeter, or a GPS device. In this example, the portable computing device 602 is integrated or attached to drone 608. The portable computing device 602 may, however, be movable relative to the drone 608, such as with a motorized gimbal system. Once the portable computing device 602 has determined the tilt angle of the portable computing device 602, the tilt angle may be communicated to a navigation system and/or the drone 608. The navigation system may navigate the drone 608 through a communication link, and/or the drone 608 may receive commands externally, or be at least partially remotely controlled. The portable computing device 602 may utilize sensors such as a GPS device to determine its current position, and that of the drone 608. The portable computing device 602 may utilize its current position information, along with the tilt angle, to determine an autofocus scan range algorithm and focus setting for situation 600 in the manner described above. The camera 606 of the portable computing device 602 focuses on the object(s) for image(s) to be captured by the device, according to the determined autofocus scan range algorithm.

Figure 7:
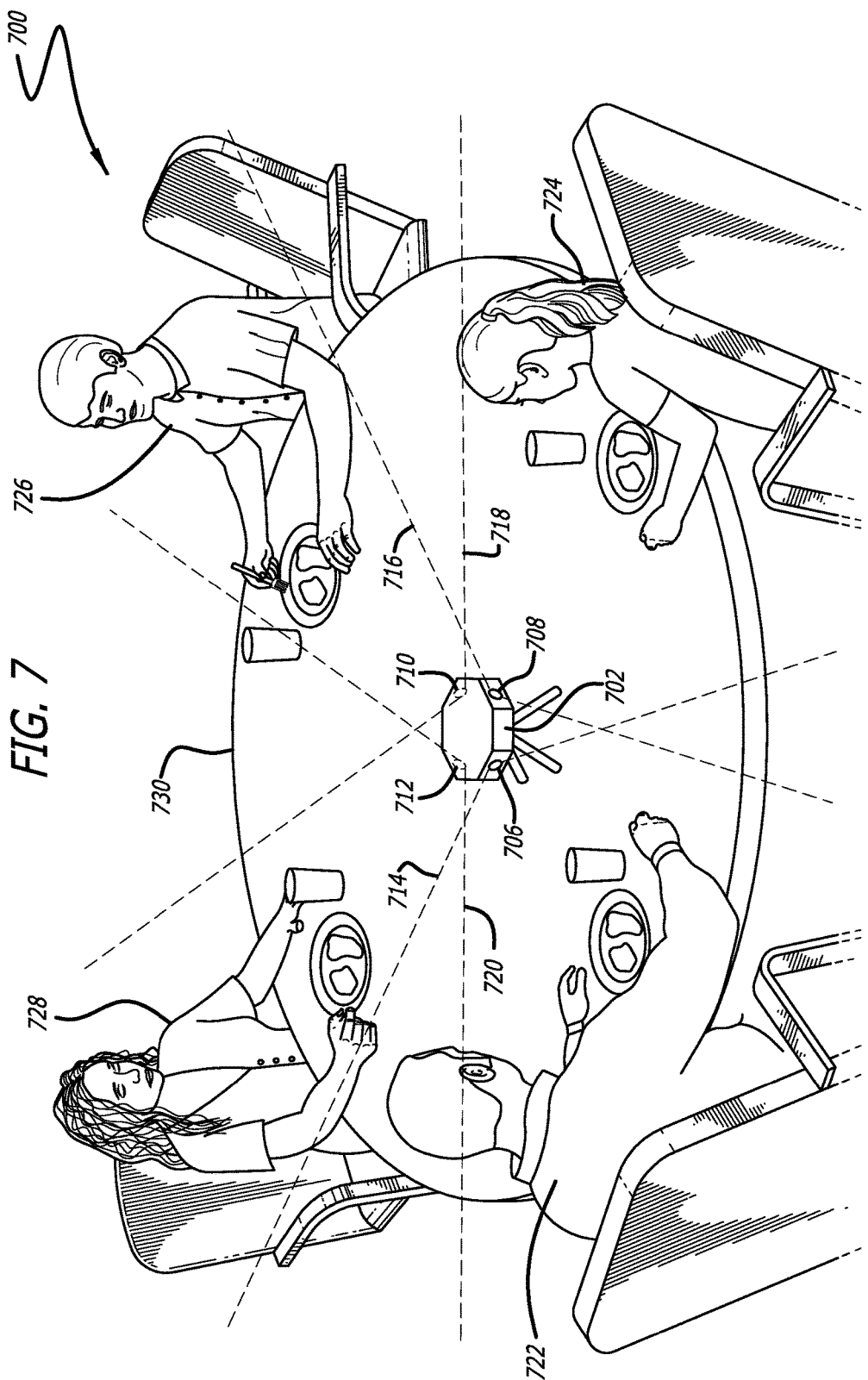
FIG. 7 is a schematic diagram illustrating an exemplary environment in which various embodiments may be implemented.

FIG. 7 is a schematic illustration of an exemplary situation 700 wherein a portable computing device 702 has multiple cameras 706, 708, 710, and 712. The portable computing device 702 determines the tilt angle of the portable computing device 702 relative to gravity through at least one sensor, such as but not limited to an accelerometer, a gyroscope, an altimeter, or a GPS device. In this example, the portable computing device 702 is located on a table 730, and the tilt angle is approximately zero degrees. Each camera 706, 708, 710, and 712 has a field of view 714, 716, 718, and 720 respectively. In this embodiment, four people 722, 724, 726, and 728 are seated around the table 730, in the fields of view of the cameras. In this embodiment, the portable computing device includes four cameras, each with a field of view, although the present disclosure is not limited with regard to the number of cameras that the portable computing device 702 can have.

In one embodiment, the camera 706 may be a primary or controlling camera. In this embodiment, the portable computing device 702 determines the tilt angle and selects or adjusts an autofocus scan range algorithm based at least in part on one of the tilt angle ranges, as described above. For the present situation 700, the tilt angle is approximately 90 degrees with respect to a direction of gravity, i.e., in a substantially flat or horizontal orientation. The focus setting for the primary or controlling camera 706 is determined based on the selected autofocus scan range algorithm. In one embodiment, the focus setting or one or more focus setting derived therefrom may then be distributed to the other cameras 708, 710, and 712 of the portable computing device 702. Additionally or alternatively, one or more autofocus scan range algorithms may be selected or adjusted for one or more of the other cameras 708, 710, and 712 based on the autofocus scan range algorithm selected or adjusted for the primary controlling camera 706. A focus setting for each of the cameras 708, 710, and 712 may then be set based on the particular autofocus scan range algorithm selected or adjusted for that camera. Such techniques may avoid having to duplicate the processing and computation completed by the portable computing device 702 for camera 706. This method saves processing time, image capture time, and energy of the portable computing device 702. In this embodiment, portable computing device 702 may be a CENTRO camera that captures multiple images with multiple cameras to create a panoramic 360 degree image. In other embodiments, the focus settings of the cameras 706, 708, 710, and 712 may each be different, or at least two may have the same focus setting. If portable computing device 702 rotates about its vertical axis (i.e., an axis extending parallel to a direction of gravity or through the surface of table 730), each camera 706, 708, 710, and 712 would move its field of view in order to capture images of people 722, 724, 726, and 728. As discussed above, using the camera 706 to predetermine a focus setting enables the other cameras 708, 710, and 712 to be preset, or at least in a better starting position to capture a focused image of the people 722, 724, 726, and 728 as the portable computing device 702 rotates.

Figure 8:
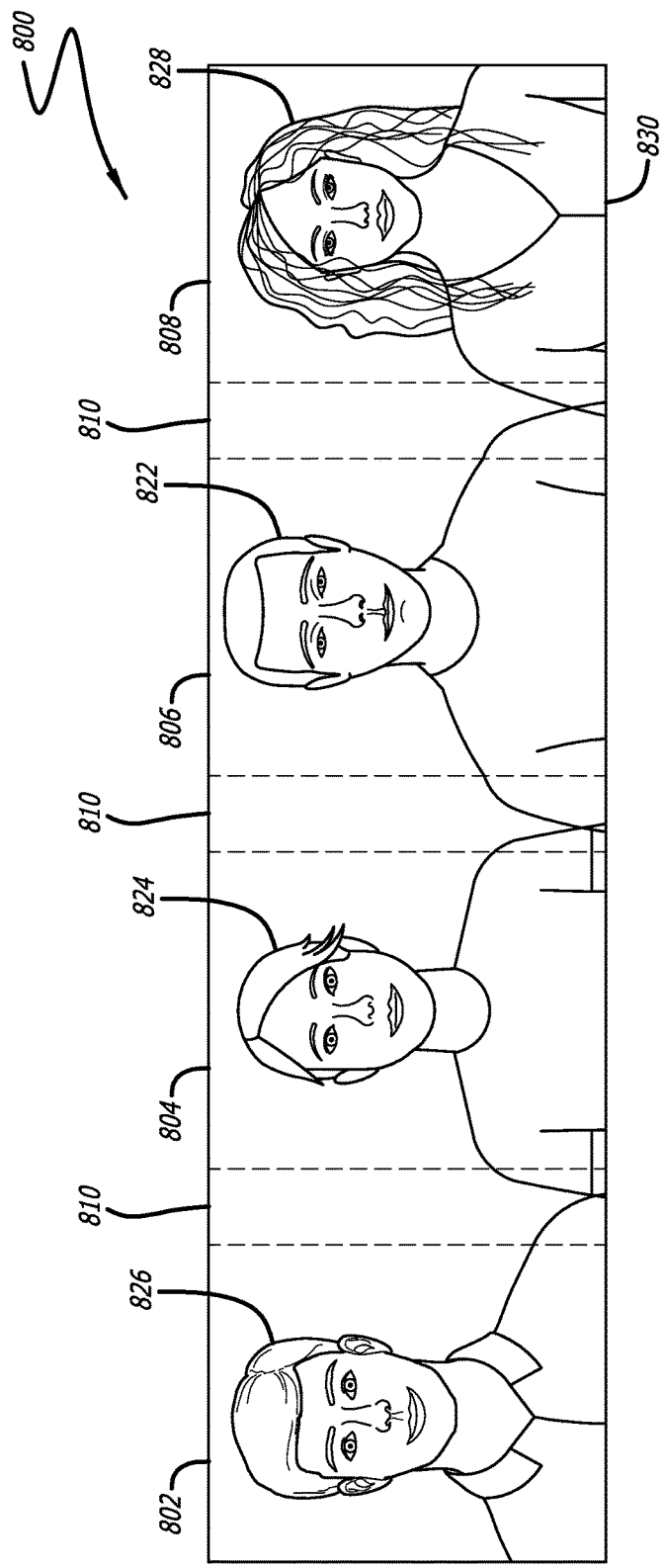
FIG. 8 is a schematic diagram illustrating an exemplary process for joining images using a panoramic camera system in accordance with various embodiments.

FIG. 8 illustrates an example situation 800 wherein a plurality of images taken by cameras 706, 708, 710, and 712 are joined or "stitched" together using the methodology disclosed herein. In this example, four images 802, 804, 806, and 808 are digitally produced and aligned next to each other by the portable computing device 702. The cameras 706, 708, 710, and 712 have overlapping fields of view 714, 716, 718, and 720 and the resulting images 802, 804, 806, and 808 have overlapping sections 810. The portable computing device 702 digitally overlaps, i.e., "stitches," and then crops the remainder of the images 802, 804, 806, and 808 to create a single 360 degree panoramic image 830 of people 822, 824, 826, and 828. It should be understood that the previous example is illustrative only and in other embodiments the tilt angle, position of objects, number of cameras may be different, but the process of determining focus settings, capturing images and joining them together to form a 360 degree panoramic image remains the same.

Figure 9:
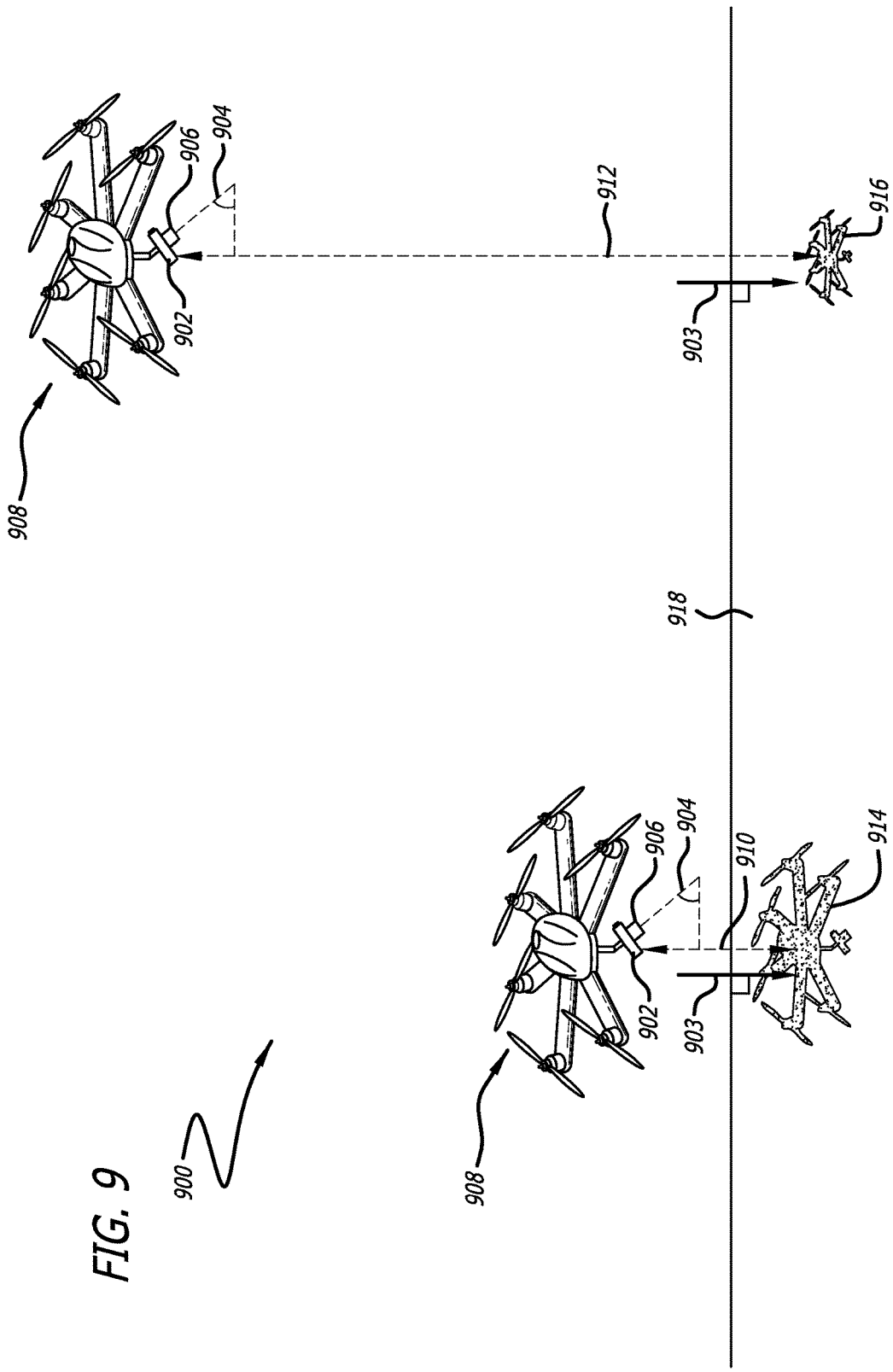
FIG. 9 is a schematic diagram illustrating an exemplary situation of a mobile portable computing device in accordance with various embodiments.

FIG. 9 illustrates an example situation 900 wherein a portable computing device 902 with a camera 906 is integrated with an autonomous vehicle or drone 908. The portable computing device 902 determines the tilt angle 904 of the portable computing device 902 relative to a direction of gravity 903 through at least one sensor, such as but not limited to an accelerometer, a gyroscope, an altimeter, or a GPS device. In this example, the portable computing device 902 is integrated, or attached to drone 908. However, the portable computing device 902 may be movable relative to the drone 908, such as with a motorized gimbal system. Once the portable computing device 902 has determined the tilt angle 904 of the portable computing device 902, the information may be communicated to a navigation system and/or the drone 908. The navigation system in the portable computing device 902 may navigate the drone 908 through a communication link, and/or the drone 908 may receive commands externally, or be at least partially remotely controlled. The portable computing device 902 may utilize sensors such as a GPS device to determine its current position, and that of the drone 908. The portable computing device 902 may utilize its current position information, along with the tilt angle 904, to determine an autofocus scan range algorithm for the situation 900, in the manner described above. The camera 906 of the portable computing device 902 focuses on the object(s) for image(s) to be captured by the device.

In one embodiment, the portable computing device 902 may identify objects such as the shadows 914, 916 of the drone 908, and determine a distance (or altitude 910, 912) from the portable computing device 902 to the object. The portable computing device 902 may store, within in its own memory, or remote memory, known characteristics of the portable computing device 902, as well as the drone 908, which is contributing to the overall shape of shadows 914, 916. In other words, portable computing device 902 may recognize the outline of its shape, in the form of shadows 914, 916. This known characteristic is useful for a variety of reasons, including to further determine distance between objects, an altitude (if the object is on the ground), and to differentiate between shadows created by other objects contributing to a cumulative shadow. For example, if the drone 908 picks up a package of unknown dimensions and carries that package, the package will cast a shadow along with the drone 908 to form a cumulative shadow. The portable computing device 908 may determine the size of the cumulative shadow and may determine the size of the package beneath drone 908, without that information being explicitly supplied. Determining the size of the package of unknown dimensions may be based at least in part on a combination of the size of the cumulative shadow, an altitude 910, 912 of the drone 908, and/or a distance from the drone 908 to the cumulative shadow.

The drone 908 is shown in FIG. 9 in two positions; a first position at an altitude 910 casting a shadow 914 on the ground 918; and a second position an altitude 912 casting a shadow 916 on the ground 918. It should be noted that in other embodiments, portable computing device 902, drone 908, and camera 906 may be combined in one device, though for purposes of explanation only, are shown here separately. The altitude 910 is less than the altitude 912 and the shadow 914 is larger than the shadow 916. When the drone is at altitude 910, the portable computing device 902 and camera 906 is also at altitude 910. Due to the proximity to the ground 918, a large shadow 914 is cast beneath the drone 908.

As described above, the portable computing device 902 can select or adjust an autofocus scan range algorithm using a determined tilt angle as well as other factors, such as object recognition. A first weight factor may be assigned to the tilt angle 904. A second weight factor may be assigned to an identity of an object. The first weight factor and the second weight factor may be used to determine an extent to which the autofocus scan range algorithm should be selected or adjusted based on the tilt angle or based on an identity of an object. In one embodiment, a predetermined or threshold altitude is identified and it is determined if drone 908 is above or beneath this predetermined threshold altitude. If, for example, drone 908 is below a predetermined threshold altitude, the tilt angle of the portable computing device 902 may be considered to have more weight than the identity of the object in the determination of a distance to the object or to selecting or adjusting the autofocus scan range algorithm. In which case, the first weight factor value for the tilt angle 904 is given a greater weight than second factor attributed to the identity of the object in selecting or adjusting the autofocus scan range algorithm and focus setting to use. When the drone 908 moves to altitude 912, which may be higher than the predetermined threshold altitude, the weight factor attributed to tilt angle 904 may be given less weight than the weight factor attributed to other factors such as the identity of the object in selecting or adjusting the autofocus scan range algorithm and focus setting to use.

In other embodiments, when drone 908 is at certain altitudes, only one of tilt angle or other factor, such as object recognition, need be used, rather than both. For example, when drone 908 is at very high altitudes, the tilt angle 904 of portable computing device 902 may not be considered to be significant and, in some embodiments might be so insignificant that it need not be included in the determination of the distance to the object to select or adjust the autofocus scan range algorithm and focus setting. In these instances, one or more other factors, i.e., object recognition, might be the factors used, without considering tilt angle 904. Alternately, if the altitude of drone 908 is very low, the tilt angle 904 of portable computing device 902 may be the only factor used in determining the distance to the object to select or adjust the autofocus scan range algorithm. In other embodiments, instead of a threshold altitude, an incremental increase or decrease in altitude of drone 908 can determine a corresponding incremental adjustment in the weights attributed to tilt angle 904, identity of the object as determined through object recognition, or any other factor used in determining the distance to the object to select or adjust the autofocus scan range algorithm and focus setting.

Figure 10:
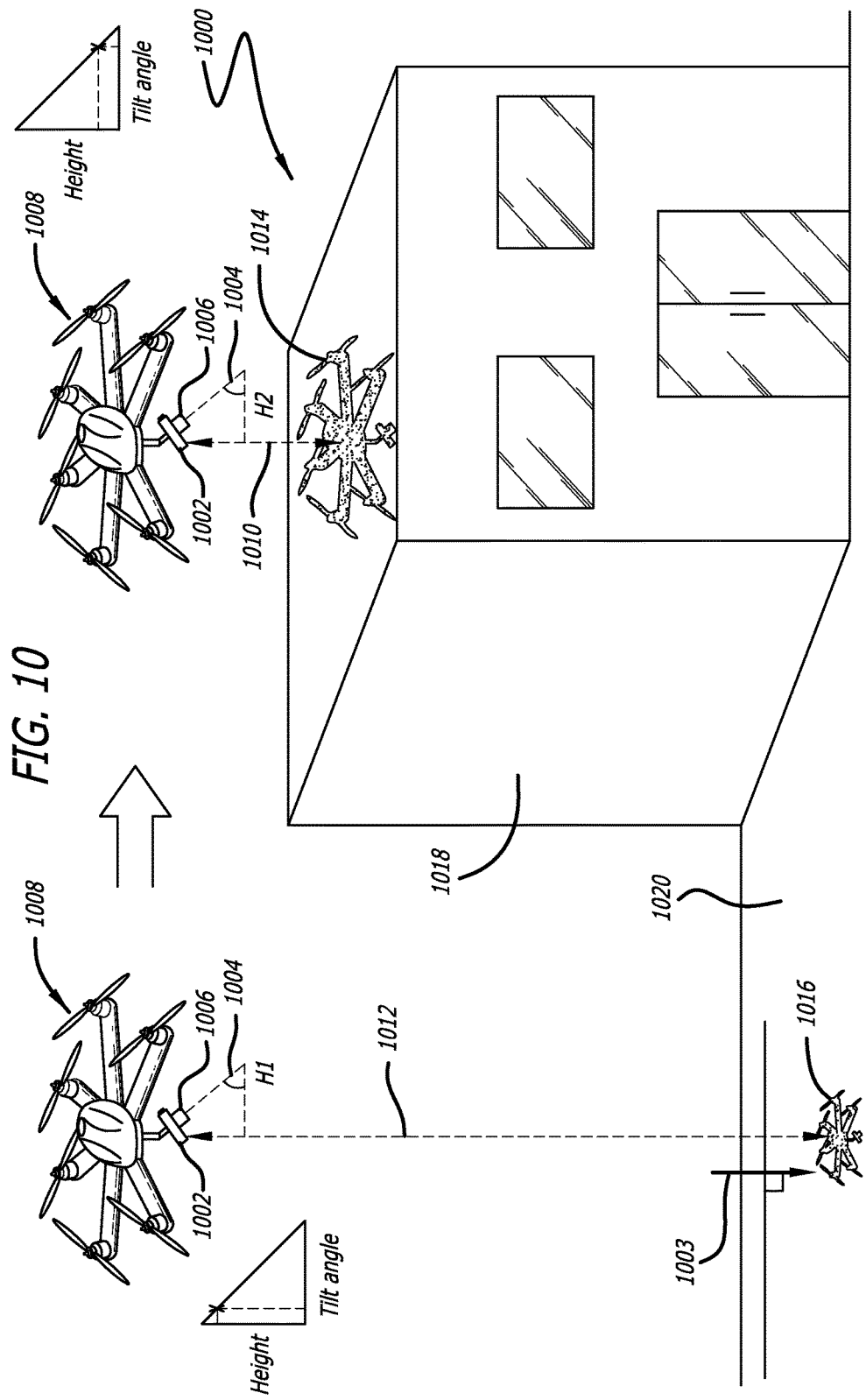
FIG. 10 is a schematic diagram illustrating an exemplary situation of a mobile portable computing device in accordance with various embodiments.

FIG. 10 illustrates an example situation 1000 wherein a portable computing device 1002 with a camera 1006 is integrated with an autonomous vehicle or drone 1008. The portable computing device 1002 determines the tilt angle 1004 of the portable computing device 1002 relative to a direction of gravity 1003 through at least one sensor, such as but not limited to an accelerometer, a gyroscope, an altimeter, or a GPS device. In this example, the portable computing device 1002 is integrated, or attached to drone 1008. Once the portable computing device 1002 has determined the tilt angle 1004 of the portable computing device 1002, the information may be communicated to a navigation system and/or the drone 1008. The navigation system in the portable computing device 1002 may navigate the drone 1008 through a communication link, and/or the drone 1008 may receive commands externally, or be at least partially remotely controlled. The portable computing device 1002 may utilize sensors such as a GPS device to determine its current position, and that of the drone 1008. The portable computing device 1002 may utilize its current position information, along with the tilt angle 1004, to determine an autofocus scan range algorithm for the situation 1000, in the manner described above. The camera 1006 of the portable computing device 1002 focuses on the object(s) for image(s) to be captured by the device.

In one embodiment, the portable computing device 1002 may identify objects such as the shadows 1014, 1016 of the drone 1008, and determine a distance (or altitude 1010, 1012) from the portable computing device 1002 to the object. The portable computing device 1002 may store, within in its own memory, or remote memory, known characteristics of the portable computing device 1002, as well as the drone 1008, which is contributing to the overall shape of shadows 1014, 1016. In other words, portable computing device 1002 may recognize the outline of its shape, in the form of shadows 1014, 1016. This known characteristic is useful for a variety of reasons, including to further determine distance between objects, an altitude (if the object is on the ground), and to differentiate between shadows created by other objects contributing to a cumulative shadow. For example, if the drone 1008 is moving over the ground 1020 at an altitude 1012, and it approaches a building 1018, the camera 1006 will capture a new shadow 1014 at an altitude 1010. The portable computing device 1008 may determine the altitude of the drone 1008 based on the change in size of the shadows 1010, 1012.

At altitude 1012, the drone 1008 is relatively high above the ground, at least compared to altitude 1010, where the drone 1008 is above a building 1018. When the drone is at altitude 1012, the tilt angle of the portable computing device 1002 can have a lower weight factor than the altitude 1012 in relation to the autofocus setting. In other words, when the portable computing device is relatively high above the ground, there are no objects in close proximity to the camera 1006, so the tilt angle 1004 has less of a factor on the autofocus setting than the altitude 1012. In order to efficiently and quickly determine the autofocus setting at altitude 1012, the portable computing device 1002 selects an autofocus scan range algorithm that is weighted toward distance rather than close-up.

At altitude 1010, the opposite is the case. The drone 1008 is relatively low to the roof of the building 1018. When the drone is at altitude 1010, the tilt angle of the portable computing device 1002 has a higher weight factor than the altitude 1012 in relation to the autofocus setting. In other words, when the portable computing device is relatively low, or close to the ground, there are objects in close proximity to the camera 1006, so the tilt angle 1004 can have more of a factor on the autofocus setting than the altitude 1010. In order to efficiently and quickly determine the autofocus setting at altitude 1012, the portable computing device 1002 selects an autofocus scan range algorithm that is weighted toward close-up rather than distance.

Figure 11:
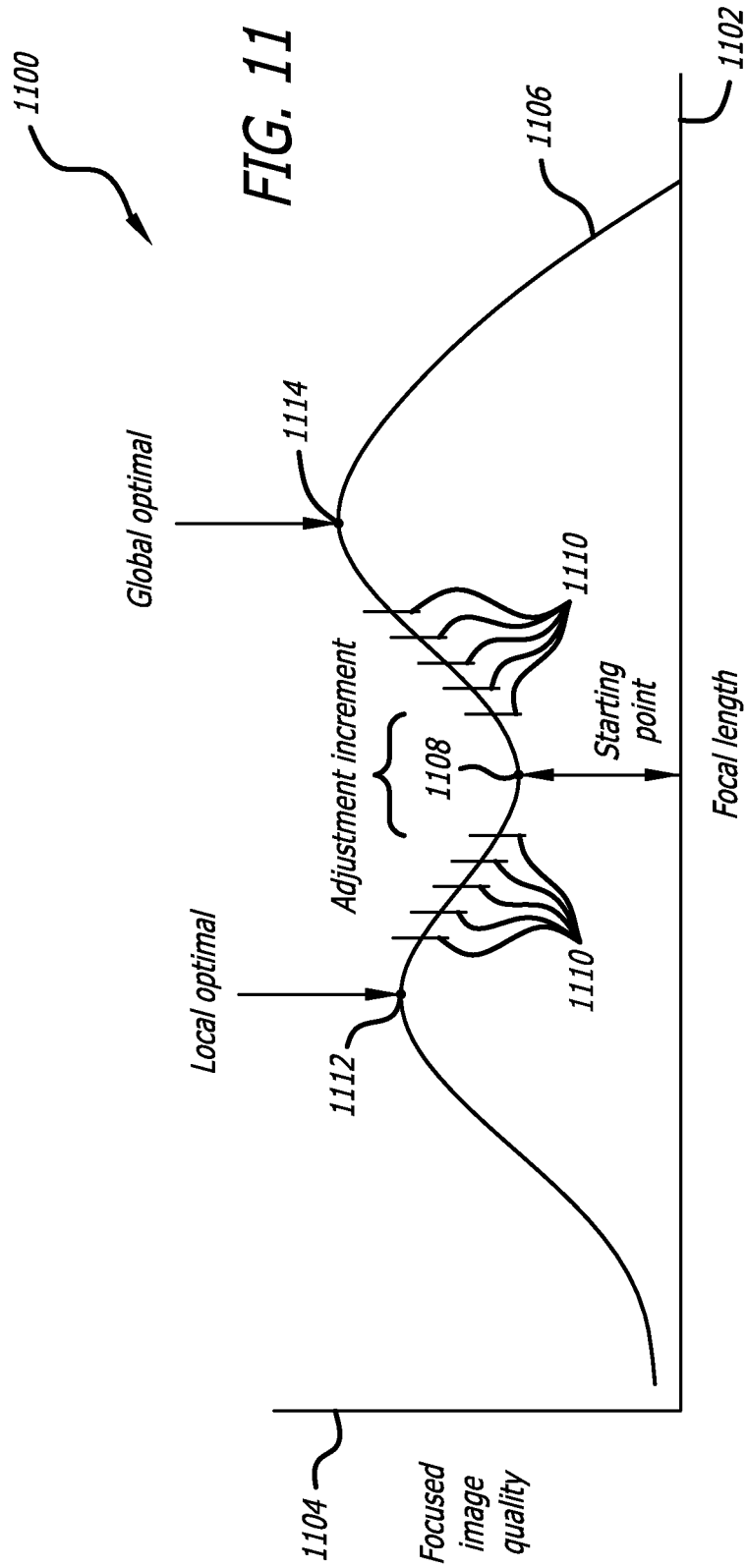
FIG. 11 is a chart illustrating the relationship between focused image quality and focal length in determining the autofocus setting in accordance with various embodiments.

FIG. 11 illustrates an exemplary process of an autofocus algorithm. The graph 1100 is bounded by a focal length x-axis 1102 and a focused image quality y-axis 1104. The focal length x-axis 1102 quantifies the focal length of a camera. The focal length may be quantified in terms of units of length. The focused image quality y-axis 1104 quantifies the quality of an image. The quality of an image may be quantified in terms of the sharpness, brightness, clarity, contrast, tint, and/or hue of an image. For photographing a given object or scene, a line 1106 may be plotted to show the focused image quality of the object or the scene at a variety of focal lengths.

An autofocus algorithm may operate by selecting a starting focal length 1108, which has coordinate values in the focal length x-axis 1102 and the focused image quality y-axis 1104. The starting focal length 1108 may be used to set an initial focal length of a camera. The camera/electronic device may capture an image at the starting focal length 1108 and analyze it to determine the focused image quality. If the image meets one or more predefined criteria for focused image quality, the autofocus algorithm may stop. Otherwise, the autofocus algorithm may adjust the focal length incrementally by an adjustment increment. After each adjustment of the focal length, a focused image quality may be determined. A plurality of data points 1110 along the line 1106 may be determined and compared.

According to some autofocus scan range algorithms the adjustment increment may be greater at larger focal lengths. For example, when focusing on an object that is close to a camera, the adjustment increments may alter the focal length by very small increments. On the other hand, when focusing on an object that is far from the camera, the adjustments increments may be comparatively large.

While testing the focused image quality at a variety of focal lengths, the autofocus algorithm may determine a peak or a maximum corresponding to focal lengths at which the focused image quality is maximized. Upon discovering a peak, the autofocus scan range algorithm may first reduce the adjustment increment to provide more resolution of the line 1106, and may eventually stop making further adjustments to the focal length upon identifying a maximum. This process of reducing the adjustment increment to find a maximum utilizes time, computing resources, and power. It is possible, however, that a peak is merely a local optimal 1112 for image quality and not a global optimal 1114 for image quality. A local optimal 1112 may be a focal length at which the focused image quality is locally maximized relative to nearby focal lengths, but may be have a lower focused image quality compared to a global optimal 1114. In other words, the global optimal 1114 may correspond to the ideal focal length for capturing a picture, whereas the local optimal 1112 is less ideal.

It is undesirable for an autofocus scan range algorithm to expend time, power, and computing resources merely to find a local optimal. Finding a global optimal 1114 instead of a local optimal 1112 may be influenced by the starting focal length 1108 and the initial adjustment increment. Various embodiments determine a starting focal length and adjustment increment having the greatest probability of identifying a global optimal.

Figure 12:
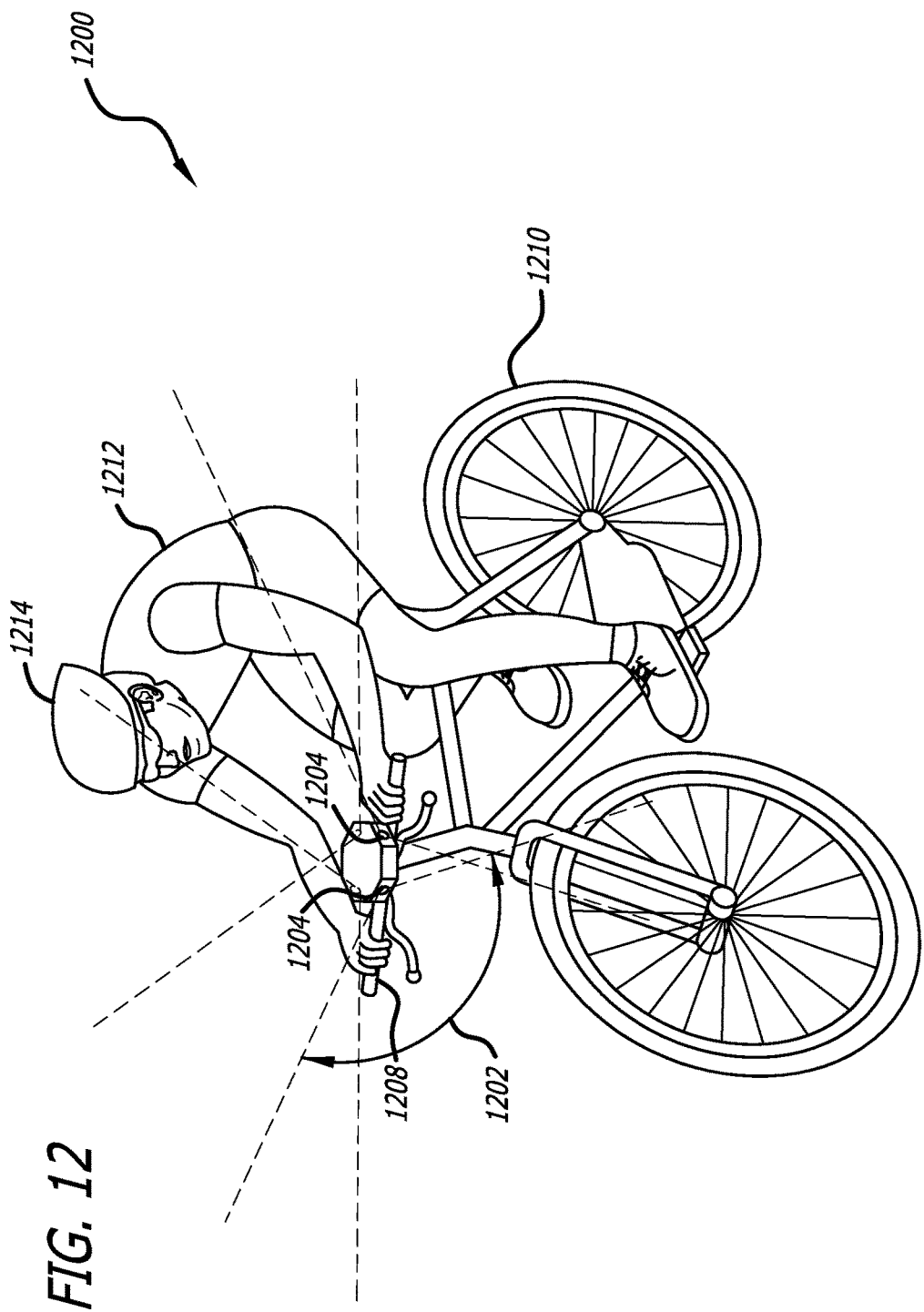
FIG. 12 is a schematic diagram illustrating an exemplary situation of a mobile portable computing device in accordance with various embodiments.

FIG. 12 illustrates an example situation 1200 wherein a portable computing device 1202 includes at least one camera 1204 and at least one field of view 1206. In this situation 1200, the portable computing device 1202 is mounted to a handlebar 1208 of a bicycle 1210. The bicycle 1210 is being ridden by a rider 1212. The cameras 1204 are oriented about the perimeter of the portable computing device 1202. In this example, one camera 1204 is oriented at the rider 1212, a second camera 1204 is oriented to the right of the rider 1212, a third camera 1204 is oriented to the left of the rider 1212, and a fourth camera 1204 is oriented away from the rider 1212, in the direction of travel of the bicycle 1210. The respective field of views 1206 of the cameras 1204 is combined to form a panoramic image by the portable computing device 1202 as described above. It should be noted that the situation 1200 is exemplary and not limiting. For example, the number of cameras 1204 of the portable computing device 1202 may be more or less than the number shown. Similarly, the portable computing device 1202 may be mounted in a variety of other locations, such as on a helmet 1214 of the rider 1212.

Figure 13:
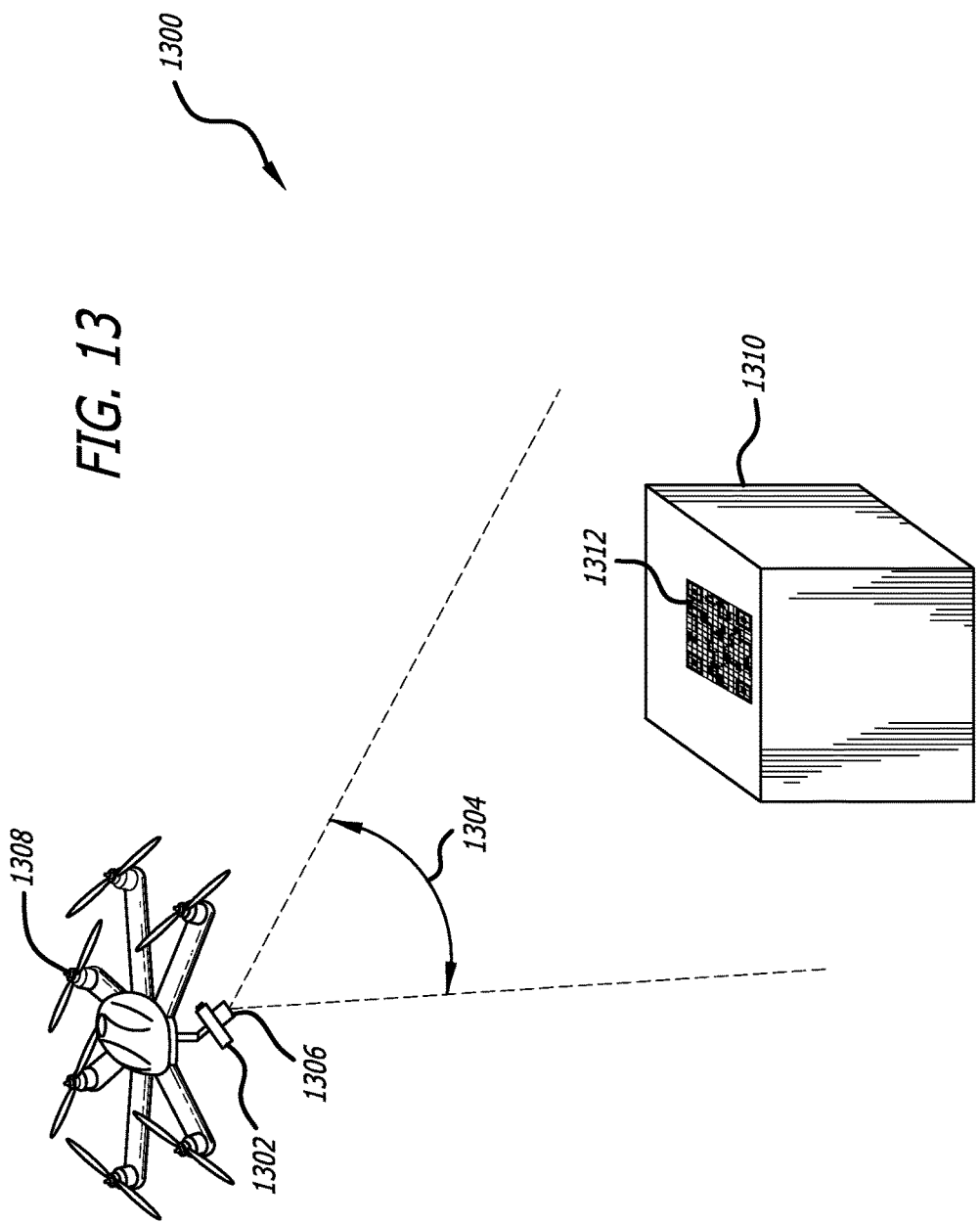
FIG. 13 a schematic diagram illustrating an exemplary situation of a mobile portable computing device in accordance with various embodiments.

FIG. 13 illustrates an example situation 1300 wherein a portable computing device 1302 includes at least one camera 1306 with a field of view 1304. The portable computing device 1302 is mounted to a drone 1308. The drone 1308, as detailed above, may be autonomous, semi-autonomous, operated by remote control, or a combination of thereof. In the situation 1300, the drone 1308 with the attached portable computing device 1302 and camera 1306 is positioned above a box 1310 with an indicia 1312. The indicia 1312 may be of a variety of types, such as but not limited to a two-dimensional bar code, standard text, or a combination thereof. The indicia 1312 may include information pertaining to the size, shape, and weight of the box 1310. For example, the indicia 1312 may include information that the box is 6×6×6 inches, weighs 2.0 lbs, and has a destination address of 123. Oak St., Springfield, USA. The portable computing device 1302 can include software or other components to interpret the indicia 1312 that is within the field of view 1304 of the camera 1306. Once the indicia 1312 has been interpreted, the portable computing device 1302 can communicate with the drone 1308 a variety of commands, such as but not limited to, approach the box 1310; pick up the box 1310; and deliver the box 1310 to 123. Oak St., Springfield, USA. In another embodiment, the indicia 1312 may include information that results in the portable computing device 1302 commanding the drone 1308 to bypass the box 1310, such as if the box is too large or too heavy for the drone 1308 to transport, or if it is not the appropriate box 1310 to be retrieved (or dropped off) by the drone 1308.

Figure 14:
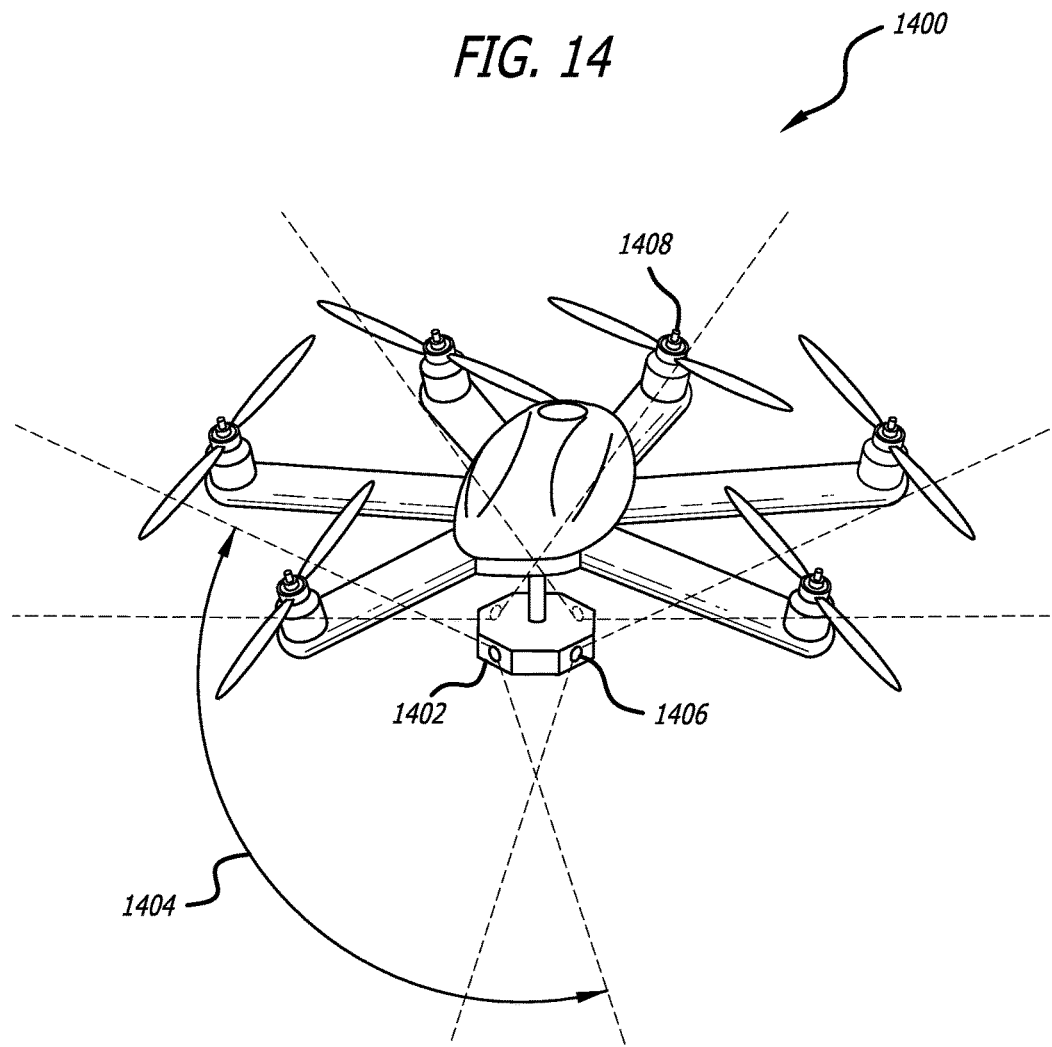
FIG. 14 a schematic diagram illustrating an exemplary situation of a mobile portable computing device in accordance with various embodiments.

FIG. 14 is an example situation 1400 wherein a portable computing device 1402 includes at least one camera 1406 with a field of view 1404. The portable computing device 1402 is mounted below a drone 1408. The drone 1408, as detailed above, may be autonomous, semi-autonomous, operated by remote control, or a combination of thereof. The cameras 1406 are oriented about the perimeter of the portable computing device 1402. In this example, one camera 1406 is oriented in one direction, a second camera 1406 is oriented in another direction, a third camera 1406 is oriented in yet another direction, and a fourth camera 1406 is oriented in still another direction. The respective field of views 1404 of the cameras 1406 is combined to form a panoramic image by the portable computing device 1402 as described above. It should be noted that the situation 1400 is exemplary and not limiting. For example, the number of cameras 1406 of the portable computing device 1402 may be more or less than the number shown. Similarly, the portable computing device 1402 may be mounted in a variety of other locations on the drone 1408.

Figure 15:
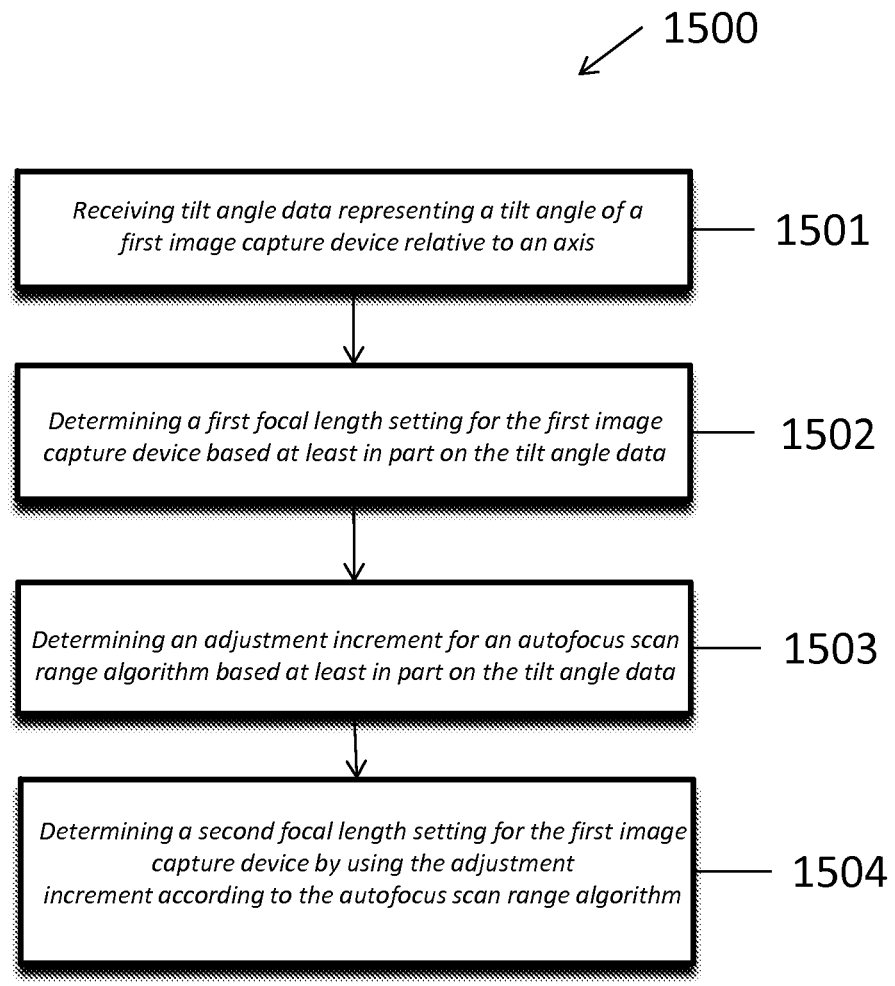
FIG. 15 is a flow chart diagram, illustrating an exemplary process for determining a first focal length setting and optionally a second focal length setting for an image capture device in accordance with various embodiments.

FIG. 15 is a flow chart diagrams illustrating an exemplary process for determining a first focal length setting and optionally a second focal length setting for an image capture device in accordance with various embodiments. As shown in FIG. 15A an exemplary process 1500 may include receiving tilt angle data representing a tilt angle of a first image capture device relative to an axis 1501. The process may further include determining a first focal length setting for the first image capture device based at least in part on the tilt angle data 1502. The process may optionally include determining an adjustment increment for an autofocus scan range algorithm based at least in part on the tilt angle data 1503. Finally the process may optionally include determining a second focal length setting for the first image capture device by using the adjustment increment according to the autofocus scan range algorithm 1504.

Figure 16:
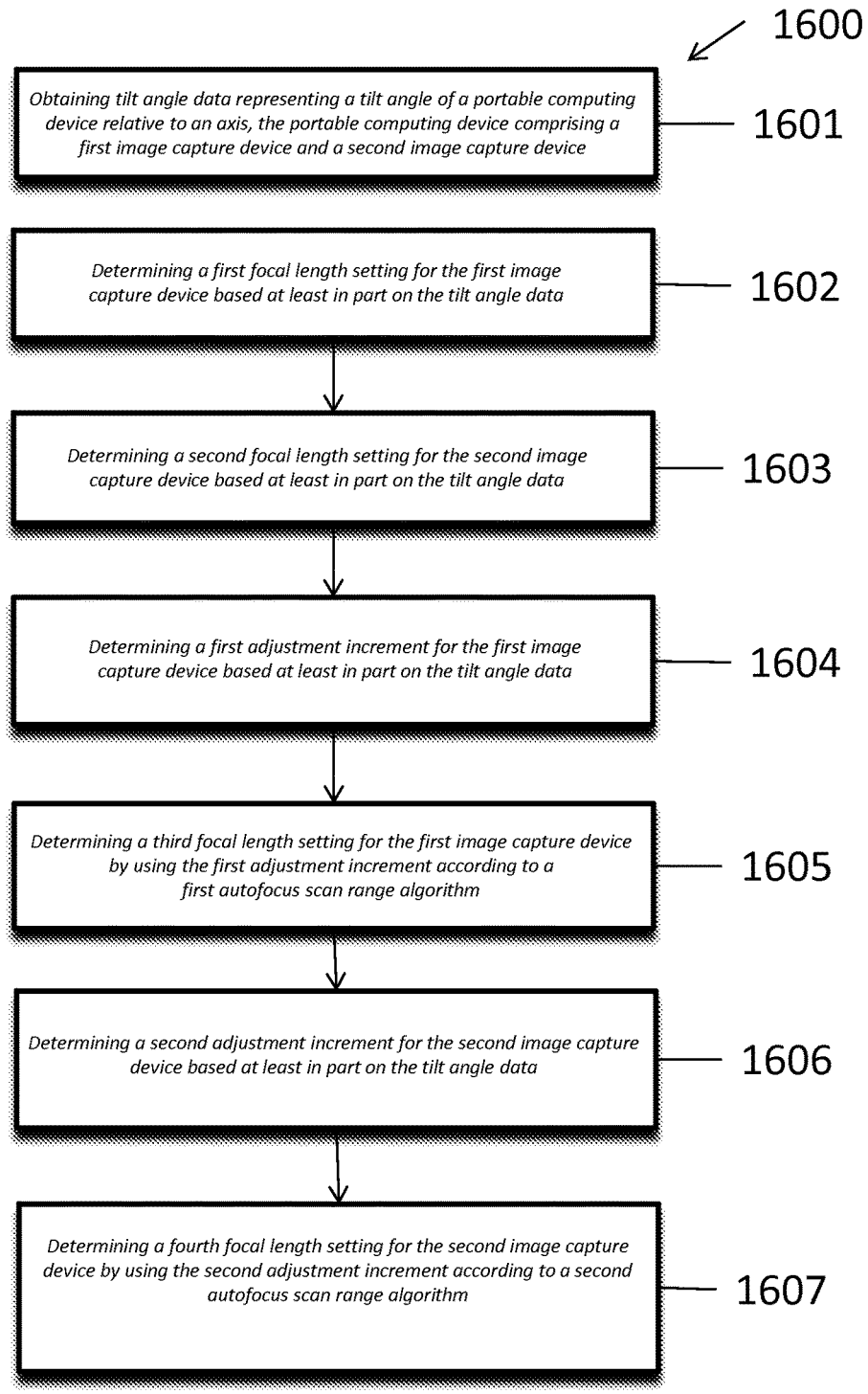
FIG. 16 is a flow chart diagram, illustrating an exemplary process for determining one or more focal length settings for a plurality of image capture devices in accordance with various embodiments.

FIG. 16 is a flow chart diagram, illustrating an exemplary process for determining focal length settings for a plurality of image capture devices. The process 1600 may include obtaining tilt angle data representing a tilt angle of a portable computing device relative to an axis, the portable computing device comprising a first image capture device and a second image capture device 1601. The process 1600 may further include determining a first focal length setting for the first image capture device based at least in part on the tilt angle data 1602. Finally, the process may include determining a second focal length setting for the second image capture device based at least in part on the tilt angle data 1603.

The process 1600 may optionally include determining a first adjustment increment for the first image capture device based at least in part on the tilt angle data 1604. The process 1600 may optionally include determining a third focal length setting for the first image capture device by using the first adjustment increment according to a first autofocus scan range algorithm 1605. The process may optionally include determining a second adjustment increment for the second image capture device based at least in part on the tilt angle data 1606. Finally, the process may optionally include determining a fourth focal length setting for the second image capture device by using the second adjustment increment according to a second autofocus scan range algorithm 1607.

Storage media and computer readable media for containing code, or portions of code, may include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which may be used to store the desired information and which may be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A system, comprising:
   a processor;
   a first image capture device on a first side of the system;
   a second image capture device on a second side of the system, wherein the second side opposes the first side;
   a memory device including instructions operable to be executed by the processor to perform a set of actions, enabling the system to:
      determine a tilt angle of the system using sensor data;
      identify a tilt angle range from a plurality of predetermined tilt angle ranges, wherein the tilt angle range overlaps with the tilt angle of the system;
      determine a first focal length setting for the first image capture device using a first associative array that associates the tilt angle range with the first focal length setting;
      determine a first adjustment increment for the first image capture device using a second associative array that associates the tilt angle range with the first adjustment increment;
      determine a second focal length setting for the first image capture device using the first adjustment increment according to a first autofocus scan range algorithm;
      determine a third focal length setting for the second image capture device using a third associative array that associates the tilt angle range with the third focal length setting;
      determine a second adjustment increment for the second image capture device using a fourth associative array that associates the tilt angle range with the second adjustment increment; and
      determine a fourth focal length setting for the second image capture device using the second adjustment increment according to a second autofocus scan range algorithm.

2. The system of claim 1, further comprising a sensor that generates the sensor data, and wherein the sensor data indicates a gravitational pull on the system.

3. The system of claim 1, the set of actions further comprising enabling the system to:

capture first image data including a representation of an object within a field of view of the first image capture device;

determine an identity of the object by comparing the first image data with second image data of known objects;

determine a dimension of the object by comparing the identity of the object with dimensional data of known objects;

determine a distance from the first image capture device to the object by comparing the dimension of the object with a scale of the object represented in the first image data relative to known dimensions of the field of view of the first image capture device;

determine the first focal length setting to focus the first image capture device at the distance; and determine the first adjustment increment using a fifth associative array that associates the distance with the first adjustment increment.

4. A method comprising:

obtaining tilt angle data representing a tilt angle of a portable computing device relative to an axis, the portable computing device comprising a first image capture device and a second image capture device;

determining a first focal length setting for the first image capture device based at least in part on the tilt angle data;

determining a first adjustment increment for the first image capture device based at least in part on the tilt angle data;

determining a second focal length setting for the first image capture device by using the first adjustment increment according to a first autofocus scan range algorithm;

determining a third focal length setting for the second image capture device based at least in part on the tilt angle data;

determining a second adjustment increment for the second image capture device based at least in part on the tilt angle data; and determining a fourth focal length setting for the second image capture device by using the second adjustment increment according a second autofocus scan range algorithm.

5. The method according to claim 4, further comprising:

determining the tilt angle data using at least one of a gyroscope and an accelerometer to determine the tilt angle of the portable computing device relative to a direction of gravity.

6. The method of claim 4, wherein determining the first focal length setting is further based at least in part on altitude data representing an altitude of the portable computing device.

7. The method of claim 6, further comprising:

assigning a first weight factor to the tilt angle data; and assigning a second weight factor to the altitude data; and determining the first autofocus scan range algorithm based at least in part on the first weight factor and the second weight factor.

8. The method of claim 7, further comprising:

determining that the altitude of the portable computing device exceeds a predetermined altitude; and assigning the second weight factor to be greater than the first weight factor.

9. The method of claim 4, further comprising identifying a touch gesture on a touch screen of the portable computing device, wherein determining the first focal length setting is further based at least in part on the touch gesture.

10. A portable computing device, comprising:

a processor;

a first image capture device;

a second image capture device;

a memory device including instructions operable to be executed by the processor to perform a set of actions, enabling the portable computing device to:

obtain tilt angle data representing a tilt angle of the portable computing device relative to an axis;

determine a first focal length setting for the first image capture device based at least in part on the tilt angle data;

determine a first adjustment increment for the first image capture device based at least in part on the tilt angle data;

determine a second focal length setting for the first image capture device by using the first adjustment increment according to a first autofocus scan range algorithm;

determine a third focal length setting for the second image capture device based at least in part on the tilt angle data;

determine a second adjustment increment for the second image capture device based at least in part on the tilt angle data; and determine a fourth focal length setting for the second image capture device by using the second adjustment increment according a second autofocus scan range algorithm.

11. The portable computing device according to claim 10, further comprising at least one of a gyroscope and an accelerometer, and wherein the set of actions further enable the portable computing device to: determine the tilt angle data using at least one of the gyroscope and the accelerometer to determine the tilt angle of the portable computing device relative to a direction of gravity.

12. The portable computing device according to claim 10, further comprising a touch screen, and wherein the set of actions further enable the portable computing device to:

identify a touch gesture on the touch screen; and determine at least one of the first focal length setting for the first image capture device or the second focal length setting for the second image capture device based at least in part on the touch gesture.

13. The portable computing device according to claim 10 wherein the set of actions further enable the portable computing device to:

identify a first object within a field of view of the first image capture device;

determine a distance from the portable computing device to the first object based at least in part on a known characteristic of the first object; and analyze the distance to determine the first focal length setting, wherein the first focal length setting focuses the first image capture device at the distance.

14. The portable computing device according to claim 10 wherein the set of actions further enable the portable computing device to:

determine the first focal length setting based at least in part on altitude data representing an altitude of the portable computing device.

15. The portable computing device according to claim 14 wherein the set of actions further enable the portable computing device to:

assign a first weight factor to the tilt angle data; and assign a second weight factor to the altitude data; and determine the first autofocus scan range algorithm based at least in part on the first weight factor and the second weight factor.

16. The portable computing device according to claim 15, wherein the set of actions further enable the portable computing device to:
determine that the altitude of the portable computing device exceeds a predetermined altitude; and
assign the second weight factor to be greater than the first weight factor.

17. The portable computing device according to claim 10 wherein the set of actions further enable the portable computing device to:
identify a touch gesture on a touch screen of the portable computing device; and
determine the first focal length setting based at least in part on the touch gesture.

18. The portable computing device of claim 17, wherein the touch gesture is a pinch-to-zoom gesture, a tap-to-zoom gesture or a combination thereof.

* * * * *